(12) United States Patent
Centmayer et al.

(10) Patent No.: US 12,546,270 B2
(45) Date of Patent: Feb. 10, 2026

(54) INTERCHANGEABLE ENGINE ASSEMBLY

(71) Applicant: Arctic Cat Inc., Thief River Falls, MN (US)

(72) Inventors: Ralf Centmayer, Markdorf (DE); Lars Kubrinski, Baindt (DE)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 18/649,993

(22) Filed: Apr. 29, 2024

(65) Prior Publication Data

US 2024/0392708 A1 Nov. 28, 2024

Related U.S. Application Data

(60) Provisional application No. 63/545,106, filed on Oct. 20, 2023, provisional application No. 63/544,072, (Continued)

(51) Int. Cl.
*F02F 7/00* (2006.01)
*F01L 1/053* (2006.01)
(Continued)

(52) U.S. Cl.
CPC ............ *F02F 7/0031* (2013.01); *F01L 1/053* (2013.01); *F02F 1/24* (2013.01); *F02F 7/0046* (2013.01); *F02F 7/0085* (2013.01); *F01L 1/022* (2013.01); *F01L 2001/0537* (2013.01); *F01L 2250/02* (2013.01); *F02F 1/242* (2013.01); *F02F 1/4285* (2013.01); *F02F 2007/0041* (2013.01); *F02F 7/006* (2013.01); *F02F 2007/0063* (2013.01); *F02F 11/005* (2013.01)

(58) Field of Classification Search
CPC ... F01L 1/022; F01L 1/053; F01L 2001/0537; F01L 2250/02; F02F 1/24; F02F 1/242; F02F 1/4285; F02F 7/0031; F02F 2007/0041; F02F 7/0046; F02F 7/006; F02F 2007/0063; F02F 7/0085; F02F 11/005
USPC .......................................... 123/90.27, 90.31
See application file for complete search history.

(56) References Cited

U.S. PATENT DOCUMENTS 2,963,007 A 12/1960 Leach
3,418,993 A * 12/1968 Scheiterlein ............ F02B 69/00
123/90.31
(Continued)

FOREIGN PATENT DOCUMENTS

CN 112159950 1/2021
DE 102012023836 6/2014
(Continued)

*Primary Examiner* — Mark A Laurenzi
(74) *Attorney, Agent, or Firm* — Billion & Armitage

(57) ABSTRACT

The present disclosure relates to an engine assembly for a vehicle. The engine assembly comprises an engine including a cylinder head and an engine block. The engine block comprises a cylinder block and a crankcase having a crankshaft. The engine may be used in different models of the vehicle having different characteristics by interchanging or replacing the cylinder head from a plurality of cylinder heads and/or a cylinder block from a plurality of cylinder blocks, while keeping one or more engine components such as the crankcase, a timing chain, or a valve cover the same. Accordingly, the engine is adaptable to different vehicles.

20 Claims, 23 Drawing Sheets

Related U.S. Application Data filed on Oct. 13, 2023, provisional application No. 63/542,865, filed on Oct. 6, 2023, provisional application No. 63/468,357, filed on May 23, 2023.

(51) Int. Cl.
  *F02F 1/24* (2006.01)
  *F01L 1/02* (2006.01)
  *F02F 1/42* (2006.01)
  *F02F 11/00* (2006.01)

(56) References Cited

U.S. PATENT DOCUMENTS

| | | | |
|---|---|---|---|
| 3,482,553 A * | 12/1969 | Buchwald | F01L 1/04 123/90.31 |
| 4,121,558 A | 10/1978 | Yamada | |
| 4,121,559 A | 10/1978 | Yamada | |
| 5,031,586 A | 7/1991 | Masuda et al. | |
| 5,367,993 A | 11/1994 | Tulach et al. | |
| 5,735,239 A | 4/1998 | Sugano et al. | |
| 6,138,633 A | 10/2000 | Prior | |
| 6,688,928 B2 | 2/2004 | Gokan et al. | |
| 7,131,412 B2 | 11/2006 | Tsutsumi et al. | |
| 7,178,498 B2 | 2/2007 | Takeuchi | |
| 7,216,612 B2 | 5/2007 | Futakuchi et al. | |
| 7,264,086 B2 | 9/2007 | Ito et al. | |
| 7,278,381 B2 | 10/2007 | Matsutani et al. | |
| 7,568,463 B1 | 8/2009 | Kuykendall | |
| 7,597,069 B2 | 10/2009 | Ashida | |
| 7,765,977 B2 | 8/2010 | Kurita et al. | |
| 8,047,174 B2 | 11/2011 | Iwasaki et al. | |
| 8,171,897 B2 | 5/2012 | Sugiura | |
| 8,381,697 B2 | 2/2013 | Yasui et al. | |
| 8,845,371 B2 | 9/2014 | Morota et al. | |
| 9,038,603 B2 | 5/2015 | Ikoma et al. | |
| 9,151,209 B2 | 10/2015 | Higaki | |
| 9,630,698 B2 | 4/2017 | Morota et al. | |
| 9,709,001 B2 | 7/2017 | Buck | |
| 10,036,346 B2 | 7/2018 | Maki et al. | |
| 10,167,753 B2 | 1/2019 | Mukohara et al. | |
| 10,400,834 B2 | 9/2019 | Sugiura et al. | |
| 10,408,115 B2 | 9/2019 | Okada et al. | |
| 10,519,896 B2 | 12/2019 | Wicks | |
| 10,781,769 B2 | 9/2020 | Choudhary et al. | |
| 10,801,607 B2 | 10/2020 | Tanaka et al. | |
| 10,883,443 B2 | 1/2021 | Wicks | |
| 10,934,969 B2 | 3/2021 | Palazzolo et al. | |
| 11,225,929 B2 | 1/2022 | Takagawa et al. | |
| 2005/0051115 A1 | 3/2005 | Wenger et al. | |
| 2007/0157900 A1* | 7/2007 | Suzuki | F01L 1/3442 123/196 R |
| 2017/0130307 A1* | 5/2017 | Li | C22C 38/02 |
| 2018/0251880 A1* | 9/2018 | Scharf | F02F 7/0085 |
| 2020/0158047 A1* | 5/2020 | Smith | F01L 1/053 |
| 2021/0131376 A1* | 5/2021 | Roth | F01M 9/107 |

FOREIGN PATENT DOCUMENTS

| | | |
|---|---|---|
| EP | 0394832 | 3/1992 |
| GB | 613388 | 11/1948 |
| WO | 2017021635 | 2/2017 |
| WO | 2020111187 | 6/2020 |
| WO | 2020111188 | 6/2020 |

* cited by examiner

INTERCHANGEABLE ENGINE ASSEMBLY

PRIORITY CLAIM

This application claims the benefit of priority from U.S. Provisional Patent Application Nos. 63/545,106 filed Oct. 20, 2023; 63/544,072 filed Oct. 13, 2023; 63/542,865 filed Oct. 6, 2023; and 63/468,357 filed May 23, 2023, the contents of which are incorporated herein by reference.

FIELD OF THE DISCLOSURE

The present disclosure generally relates to engines for off-road vehicles. More particularly, the present disclosure relates to an engine assembly for off-road vehicles having one or more interchangeable features.

BACKGROUND

An internal combustion engine of a vehicle converts thermal energy into mechanical energy to drive moving parts of the vehicle, thereby enabling motion of the vehicle. Depending on the type of vehicle, designs and structures of the engine may vary to suit the purposes and parameters of the intended vehicle. For instance, off-road vehicles, such as all-terrain vehicles (ATV) and side-by-side utility terrain vehicles (UTV or side-by-side) may have different engine design and structure than that of a snowmobile. Furthermore, even within the various categories, some vehicles may be intended more for utility work whereas others may be intended mostly for sport. Other various purposes exist, such as vehicles for youth or novice riders and vehicles for expert riders. Typically, the engine includes a cylinder head having intake ports through which an air and fuel mixture enters cylinders of the engine, and exhaust ports through which gases produced by combustion of the air and fuel mixture are expelled.

SUMMARY OF THE DISCLOSURE

In some embodiments, an engine is provided that is adaptable to different vehicles without changing a basic design of the engine. In an illustrative example, different designs and modifications are made to accommodate interchangeability of a cylinder head and a cylinder block while other engine components remain constant.

In some embodiments, the present disclosure sets forth an engine assembly of a vehicle extending from a front side to a rear side. The engine assembly comprises an engine including a cylinder block, and a cylinder head mounting interface configured to receive a cylinder head from a plurality of cylinder heads. The plurality of cylinder heads comprises at least one of a first cylinder head and a second cylinder head. Each of the first cylinder head and the second cylinder head configured to receive at least one cam shaft therewithin. A first location of the at least one cam shaft in the first cylinder head is same as a second location of the at least one cam shaft in the second cylinder head.

The engine assembly comprises an engine that includes an engine block. The engine block includes a cylinder block and a crankcase. The cylinder block is selected from a plurality of cylinder blocks, the plurality of cylinder blocks comprises at least one of a first cylinder block and a second cylinder block. The crankcase is same for the engine having any one of the first cylinder block and the second cylinder block.

In some embodiments, the first cylinder head may comprise a first intake camshaft and a first exhaust camshaft therewithin, and the second cylinder head may comprise a second intake camshaft and a second exhaust camshaft therewithin. A first intake camshaft location is same as a second intake camshaft location. A first exhaust camshaft location is same as a second exhaust camshaft location.

The engine may further comprise a timing chain positioned at a first side of a central axis of the vehicle extending in a longitudinal direction. The timing chain is configured to connect a first end of the at least one camshaft and a first end of the crankshaft to synchronize a rotation of the crankshaft and the at least one camshaft for opening and closing of at least one intake valve and at least one exhaust valve. The timing chain may be same for the engine having any one of the first cylinder head and the second cylinder head.

In some embodiments, the first cylinder block comprises a plurality of first cylinders including a plurality of first pistons being axially reciprocable, and a plurality of first piston rings configured to form a seal between a respective first piston and a respective first cylinder inner wall. The second cylinder block comprises a plurality of second cylinders including a plurality of second pistons being axially reciprocable, and a plurality of second piston rings that form a seal between a respective second piston and a respective second cylinder inner wall.

Each of the plurality of the first cylinders may comprise a first cylinder inner wall having a first coating, and each of the plurality of the second cylinders may comprise a second cylinder inner wall having a second coating.

In some embodiments, the cylinder block comprises at least one cylinder sleeve that is located inside a corresponding cylinder for providing sealing between an inner wall of the corresponding cylinder and a corresponding piston.

The present disclosure also includes a method of assembling two different vehicle engines, the engines having a common crankcase design. The method includes providing a crankcase, providing a first cylinder head and a second cylinder head, and assembling either the first or second cylinder head. The first cylinder head is different from the second cylinder head. Assembling the first or the second cylinder head includes securing the selected cylinder head to a common crankcase. One cylinder head is used for one type of vehicle, while the other cylinder head is used for another type of vehicle.

Another disclosed method of assembling two different vehicle engines includes engines having a common crankcase design. The method comprises providing a crankcase, a first cylinder block, and a second cylinder block that is different from the first cylinder block. The first cylinder block is assembled to the crankcase for a first vehicle engine. The second cylinder block to the crankcase for a second vehicle engine.

The method may further comprise providing a first cylinder head having an intake on a first side and a second cylinder head having an intake on a second side. One may choose either the first or the second cylinder head depending on the cylinder block. The chosen cylinder head is secured to the cylinder block.

BRIEF DESCRIPTION OF THE DRAWINGS

A more complete understanding of the present disclosure may be derived by referring to the detailed description and claims when considered in connection with the Figures, wherein like reference numerals refer to similar elements throughout the Figures.

DETAILED DESCRIPTION

The following description sets forth exemplary embodiments of the invention only, and is not intended to limit the scope, applicability, or configuration of the invention. Rather, the following description is intended to provide a convenient illustration for implementing various embodiments of the invention. As will become apparent, various changes may be made in the function and arrangement of the elements described in these embodiments without departing from the scope of the invention as set forth herein. It should be appreciated that the description herein may be adapted to be employed with alternatively configured devices having different shapes, components, attachment mechanisms, and the like and still fall within the scope of the present invention. Thus, the detailed description herein is presented for purposes of illustration only and not of limitation.

The disclosures of the following applications are hereby incorporated by reference: Application Ser. No. 63/537,179, filed Sep. 7, 2023; and Application Ser. No. 63/543,461, filed Oct. 10, 2023.

Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Embodiments of the present disclosure describe an engine assembly, and a vehicle having the engine assembly. The term 'engine assembly' used throughout the disclosure may comprise an engine having a cylinder head, a cylinder block, a crankshaft, camshafts, a camshaft drive or a timing chain, a valve cover, and other associated parts. The engine may be an internal combustion engine. Components described herein may be utilized for different vehicles such as on-road vehicles and off-road vehicles. For example, the engine of the present disclosure may be used in different models of the vehicle having different characteristics by interchanging or replacing a cylinder head and/or a cylinder block, while keeping one or more other engine components, such as the crankcase, the camshafts, the camshaft drive and/or the valve cover the same. Accordingly, the number of engine components to be replaced or modified are reduced (i.e., maximizing common components) while adapting to different vehicles. The engine of the present disclosure may offer ease of installation or modification during interchanging of the cylinder head and/or the cylinder block, thereby improving installation efficiency.

Figure 1:
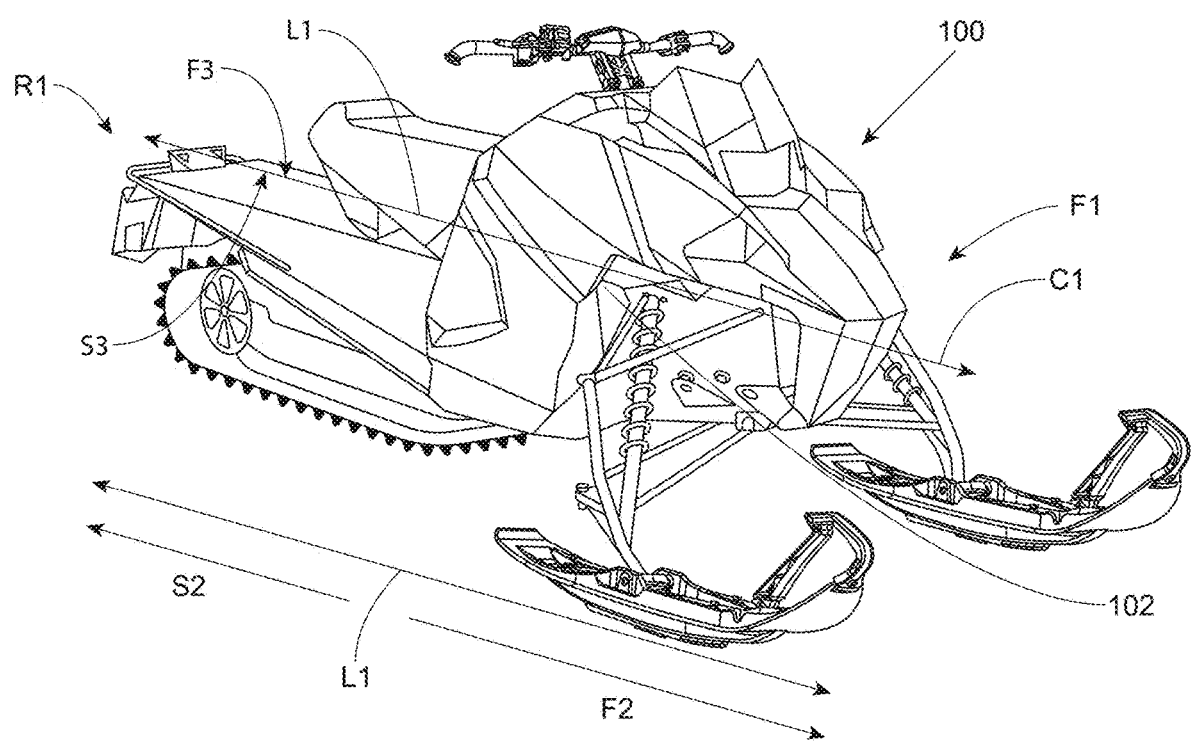
FIGS. 1-2 illustrate exemplary perspective views of off-road vehicles.
Figure 2:
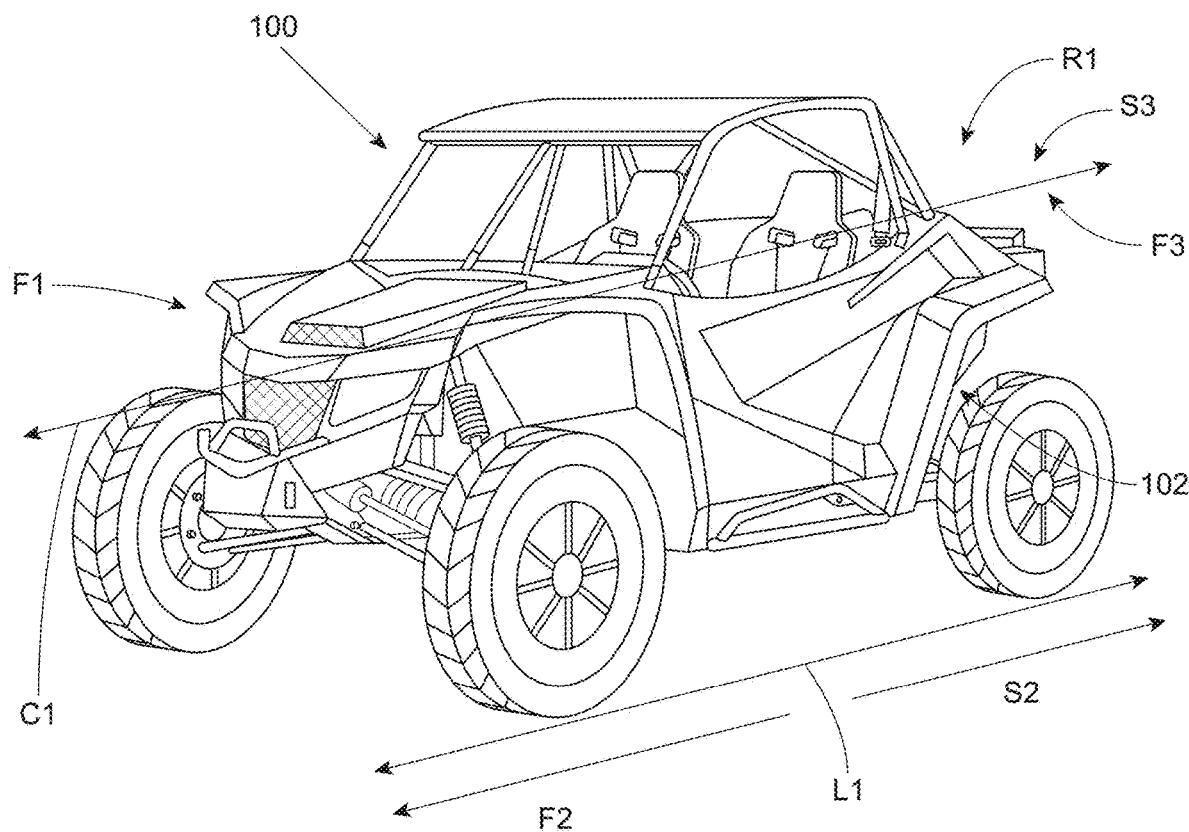

Reference is now made to FIGS. 1-2, which illustrate off-road vehicles such as a snowmobile and a side-by-side vehicle. It is to be noted that the present disclosure relates to engine assemblies of an off-road vehicle, represented as 100. Accordingly, the reference numeral 100 generally represents an off-road vehicle. The vehicle 100 extends from a front side (F1) to a rear side (R1) in a longitudinal direction having a longitudinal axis (L1) and a central axis (C1) extending in the longitudinal direction and passing through a centre of the vehicle 100. The vehicle 100 generally comprises an engine assembly 102 (pointing in a general location of an engine that is behind body panels shown) and other components that facilitate translation of combustion energy or thermal energy to rotational energy for enabling movement of the vehicle 100. The engine assembly 102 comprises an engine 300 including a cylinder head 302, an engine block 306, camshafts 602, a camshaft drive or a timing chain 1704, a valve cover 312, and other associated parts. The engine block 306 comprises a cylinder block 320 and a crankcase 308 having a crankshaft 310 (seen e.g., in FIGS. 3, 4, 11, and 14).

Figure 3:
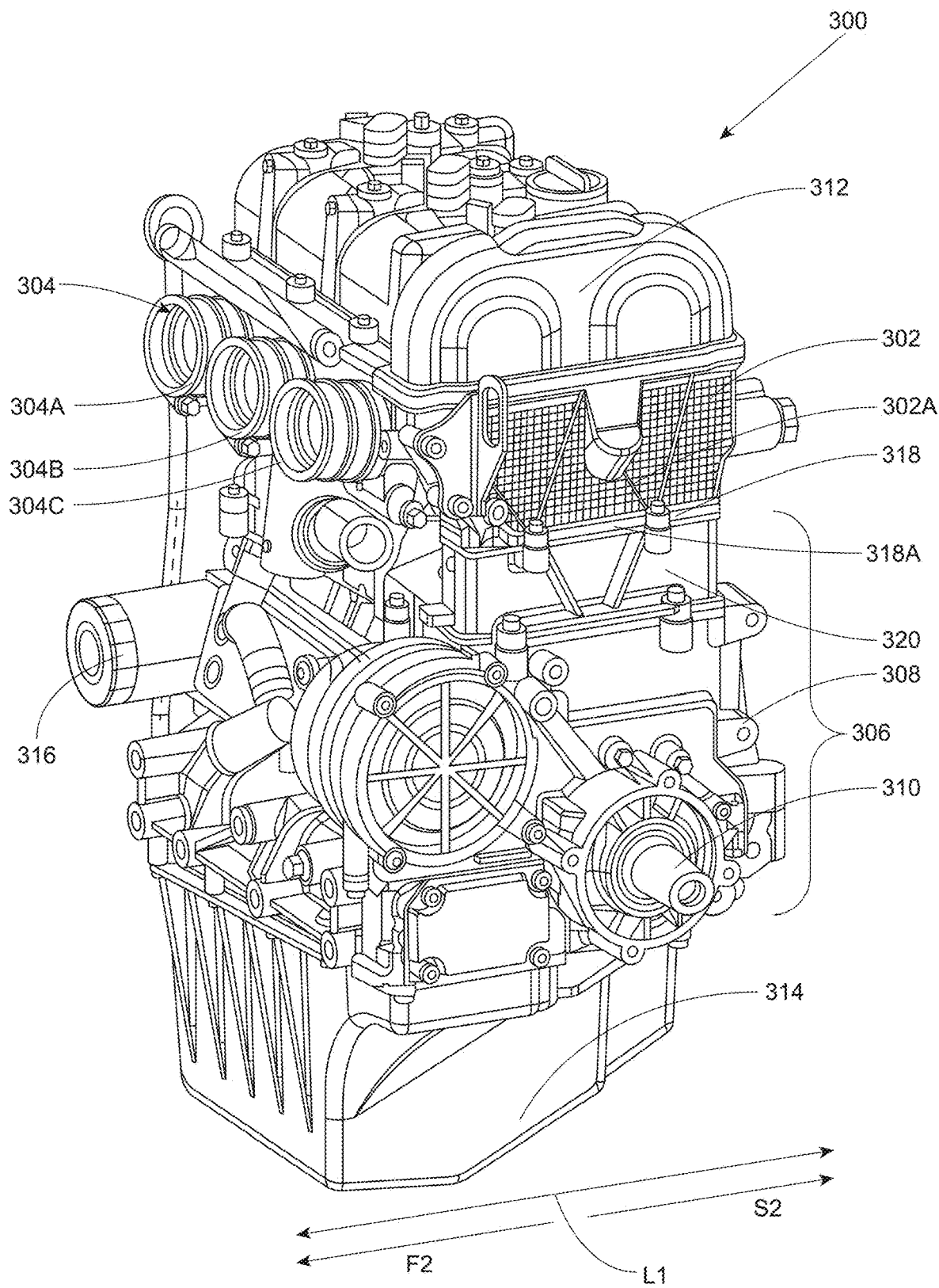
FIG. 3 illustrates an exemplary isometric view of an engine with forward intake ports in accordance with the present disclosure.
Figure 4A:
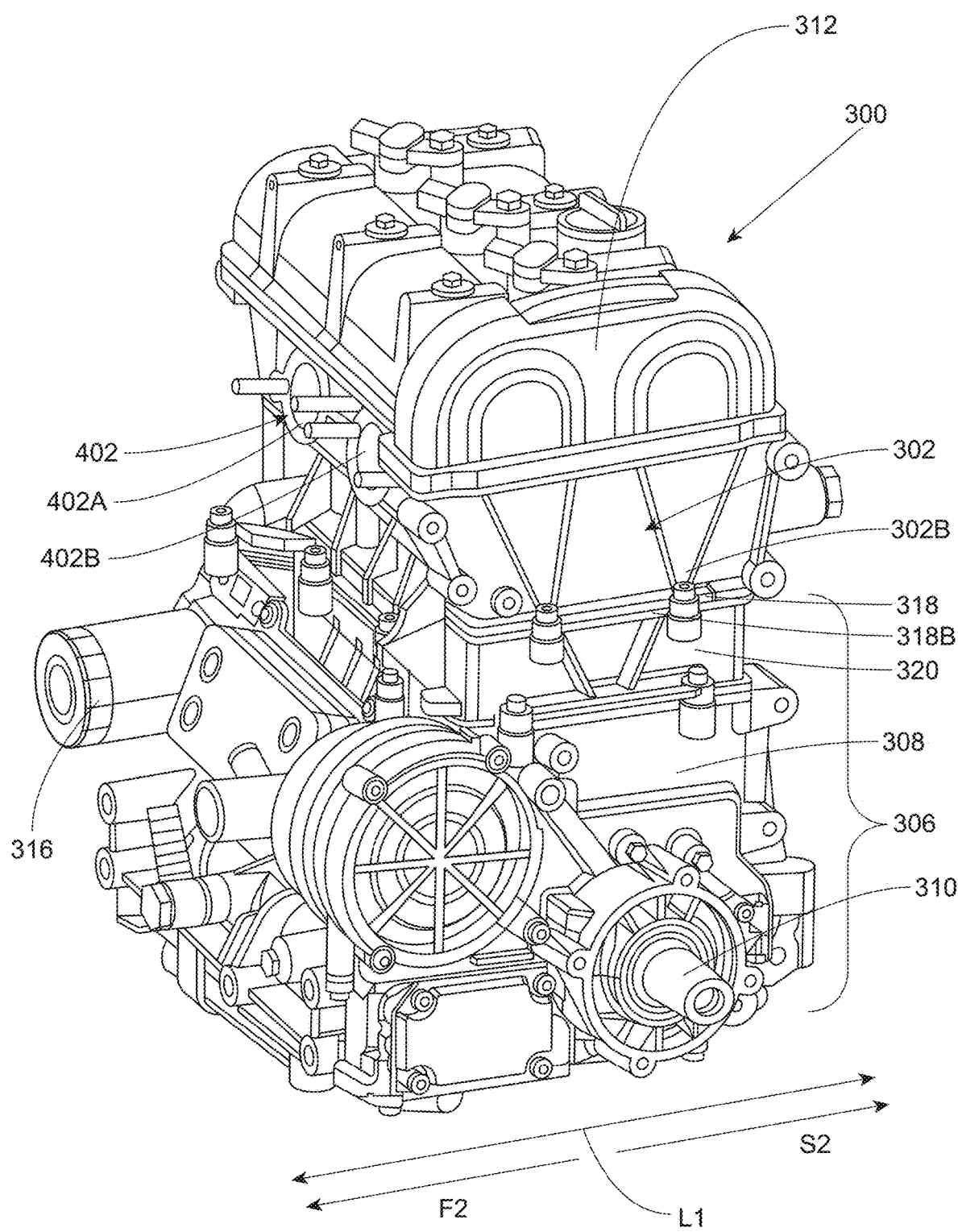
FIGS. 4A-4B illustrate exemplary isometric views of an engine with forward exhaust ports and rearward exhaust ports in accordance with the present disclosure.
Figure 4B:
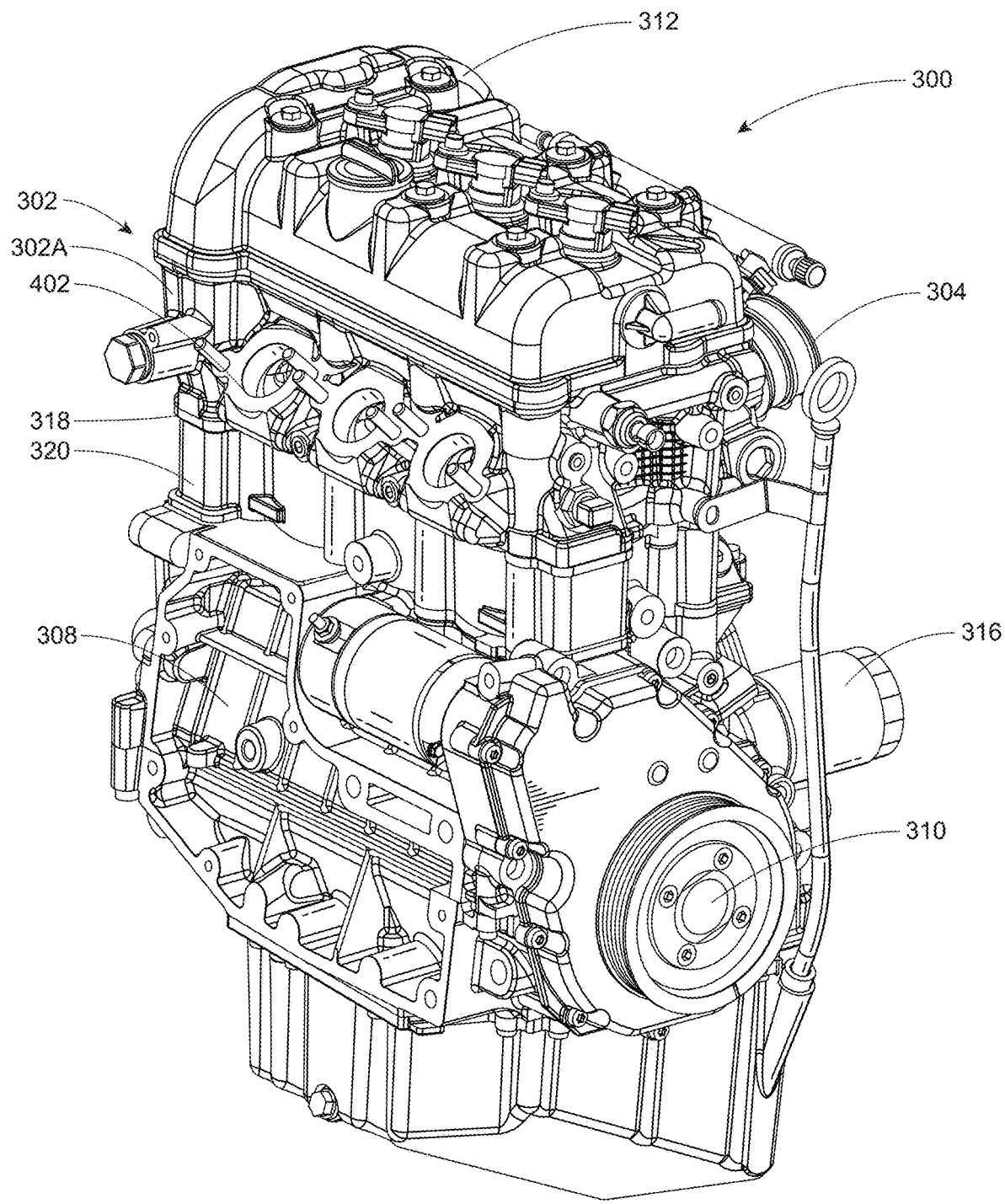
Figure 5:
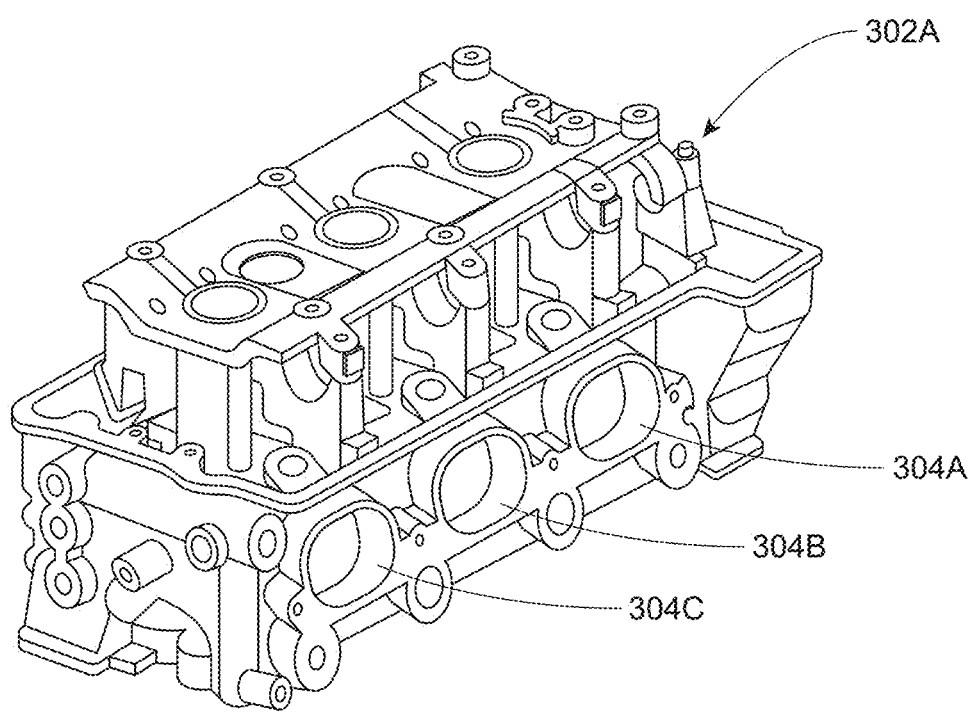
FIG. 5 illustrates an exemplary isometric view of a first cylinder head with forward intake ports in accordance with the present disclosure.

The engine 300 may be configured to receive the cylinder head 302 from a plurality of cylinder heads (seen e.g., in FIGS. 3-4). The plurality of cylinder heads may include at least one of a first cylinder head 302A and a second cylinder head 302B (seen e.g., in FIGS. 3-4). The engine 300 is configured to receive each of the first cylinder head 302A and the second cylinder head 302B thereon. Hence, the engine 300, in accordance with the present disclosure, facilitates use of different cylinder heads in the engine 300, thereby facilitating interchangeability of the cylinder heads based on a use/application of the off-road vehicle. For instance, an engine used in a snowmobile having the cylinder head with the forward exhaust port and the rearward intake port may be used in a side-by-side vehicle by interchanging with the cylinder head having the forward intake port and the rearward exhaust port without modifying the basic engine design, thus maintaining parts commonality.

The engine 300 may comprise a cylinder head mounting interface 318 for mounting the cylinder head 302. The cylinder head mounting interface 318 may correspond to a top surface of the cylinder block 320. The cylinder head 302 is removably mounted to the cylinder block 320, via the cylinder head mounting interface 318, at a mounting location using at least one fastener. The mounting location and a pattern of the mounting location in the cylinder head mounting interface 318 are the same for the first cylinder head 302A and the second cylinder head 302B. Similarly, a mounting location and a pattern of the mounting location in the first cylinder head 302A and the second cylinder head 302B are same. The mounting location may be an aperture, a hole, a threaded hole, a bore, and the like. The first cylinder head 302A is configured to be removably mounted to the cylinder block 320, via a cylinder head mounting interface 318A, at a first mounting location 1402 using at least one first fastener (seen e.g., in FIGS. 3 and 14). The second cylinder head 302B is also configured to be removably mounted to the cylinder block 320, via a cylinder head mounting interface 318B, at a second mounting location using at least one second fastener (seen e.g., in FIG. 4). In such structure, the first mounting location 1402 and the second mounting location are the same on the cylinder head mounting interfaces 318A, 318B. Additionally, a cylinder head gasket may be placed between the cylinder head 302 and the cylinder block 320 for providing sealing between the cylinder head 302 and the cylinder block 320. It is to be noted that the same cylinder head gasket may be used for both the first cylinder head 302A and the second cylinder head 302B. Such structure of the engine 300 facilitates mounting of different cylinder heads to the cylinder block 320 without any modification in the engine 300 and/or the mounting interface 318, thereby providing more flexibility in interchanging the cylinder heads.

Figure 15A:
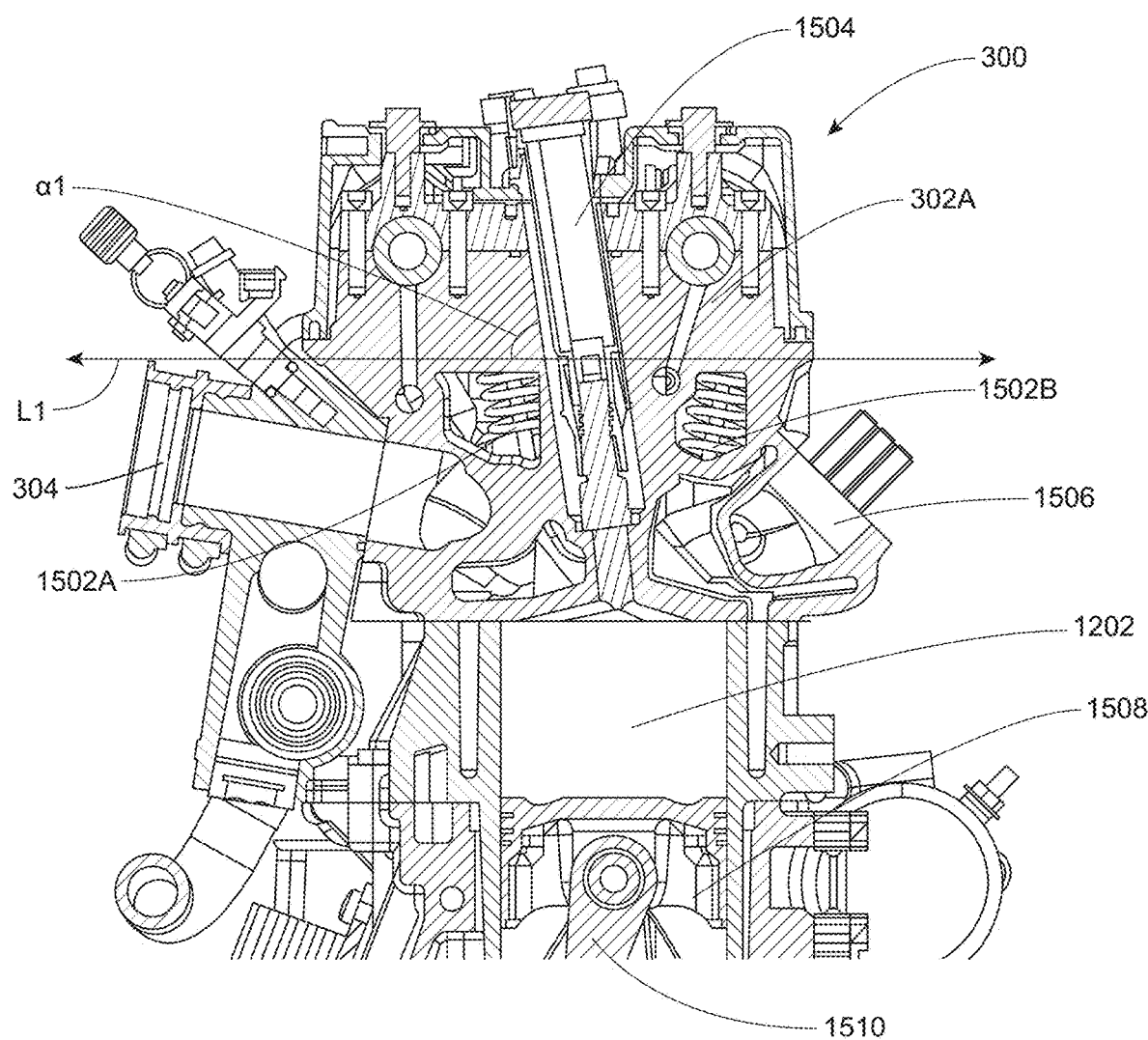
FIGS. 15A-15B illustrate exemplary cross-sectional elevational views of an engine with forward intake ports in accordance with the present disclosure.
Figure 15B:
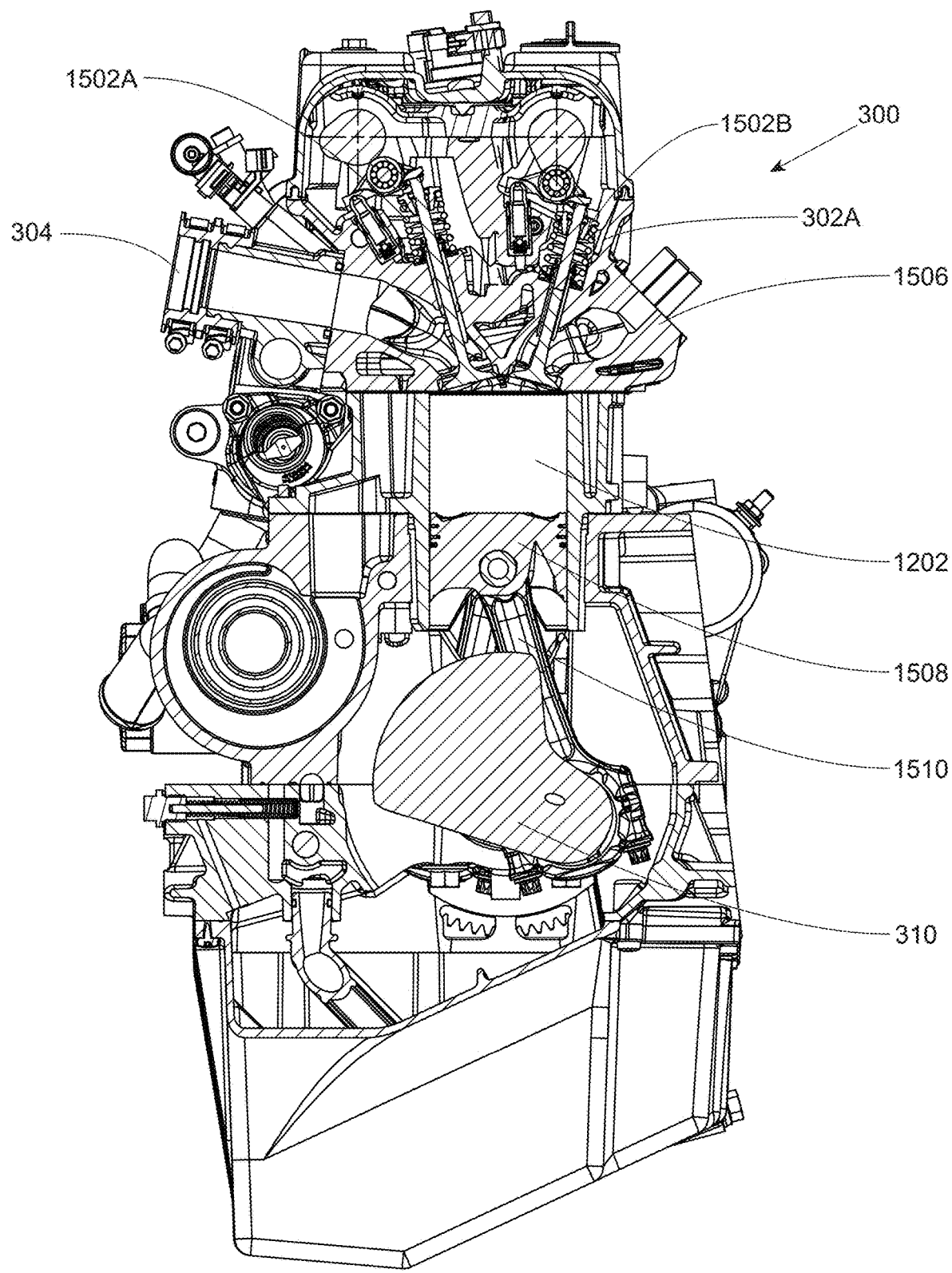

The first cylinder head 302A comprises at least one forward intake port 304 through which air and fuel mixture enters the engine 300, and at least one rearward exhaust port 1506 through which gases produced by combustion of the air and fuel mixture are expelled (seen e.g., in FIGS. 3 and 15). The at least one forward intake port 304 is configured to be positioned towards a first direction (F2) of the longitudinal axis (L1) of the vehicle 100, and the at least one rearward exhaust port 1506 positioned towards a second direction (S2) of the longitudinal axis (L1) (seen e.g., in FIG. 3). In some embodiments, the at least one forward intake port 304 may comprise a first forward intake port 304A, a second forward intake port 304B, and a third forward intake port 304C (seen e.g., in FIG. 3). The first direction (F2) corresponds to the front side (F1) of the vehicle 100 and the second direction (S2) corresponds to the rear side (R1) of the vehicle 100.

Figure 16A:
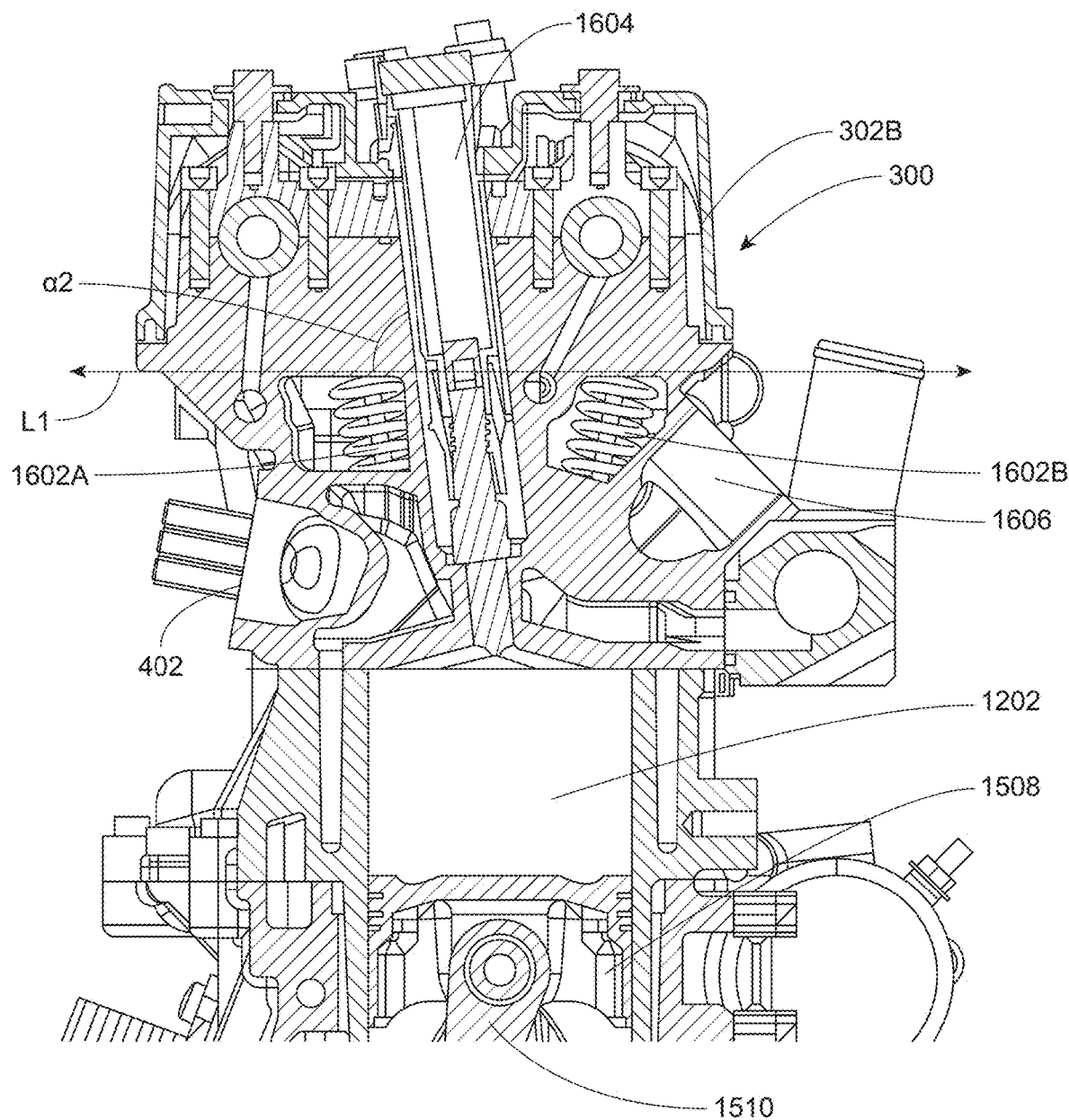
FIGS. 16A-16B illustrate exemplary cross-sectional elevational views of an engine with forward exhaust ports in accordance with the present disclosure.
Figure 16B:
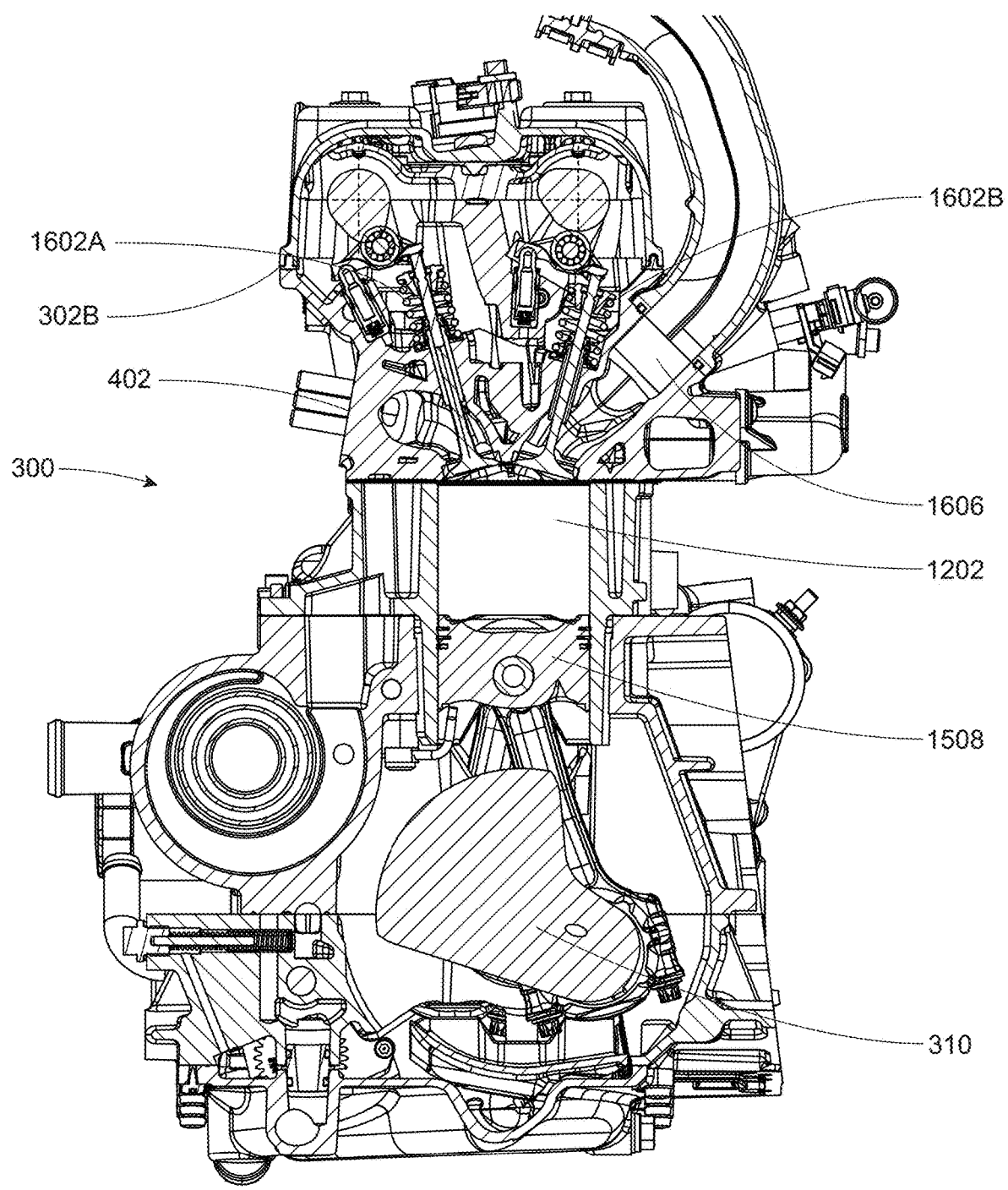
Figure 18A:
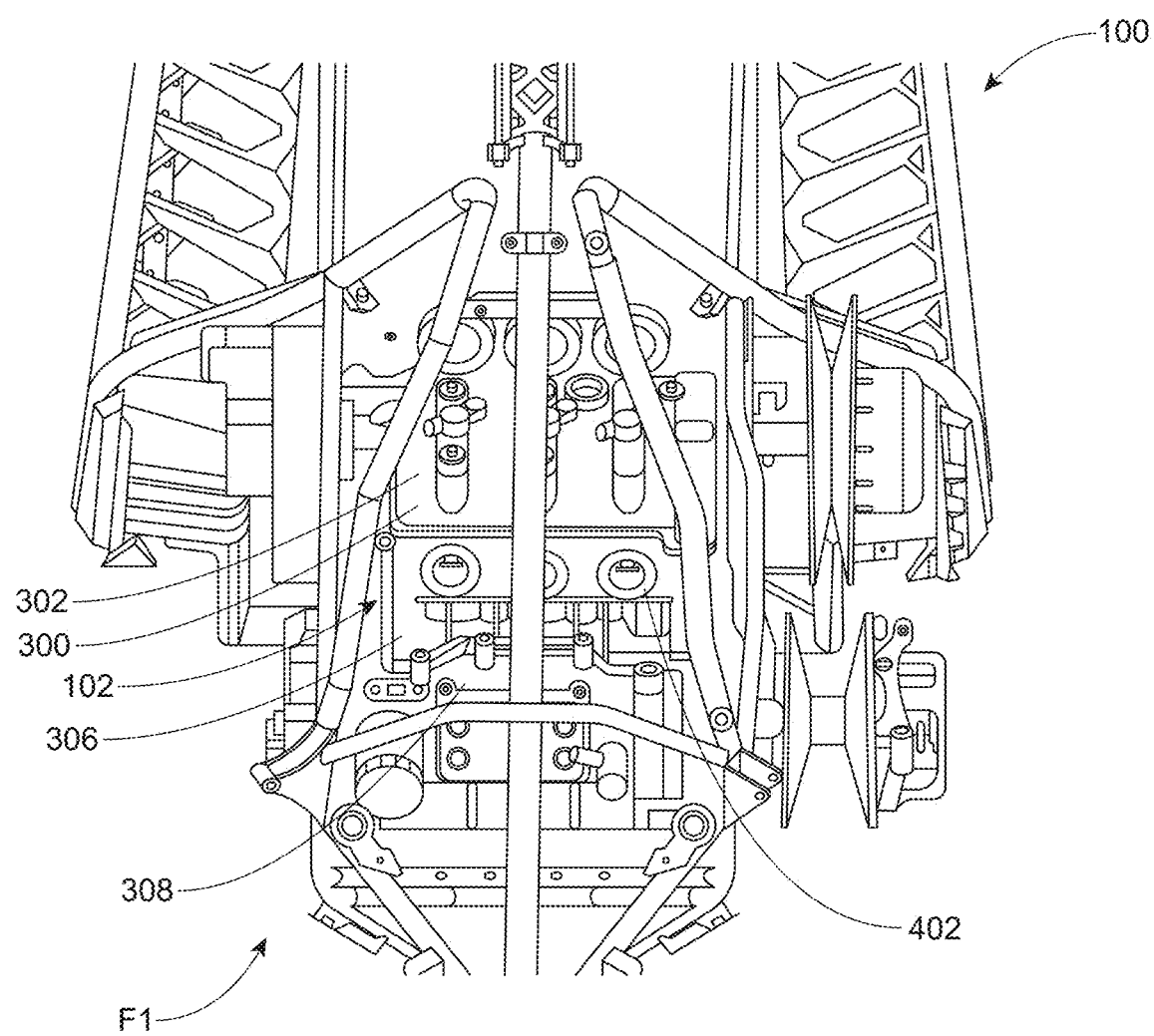
FIGS. 18A and 18B illustrate an engine with rearward intake ports mounting in a forward portion of a snowmobile.
Figure 18B:
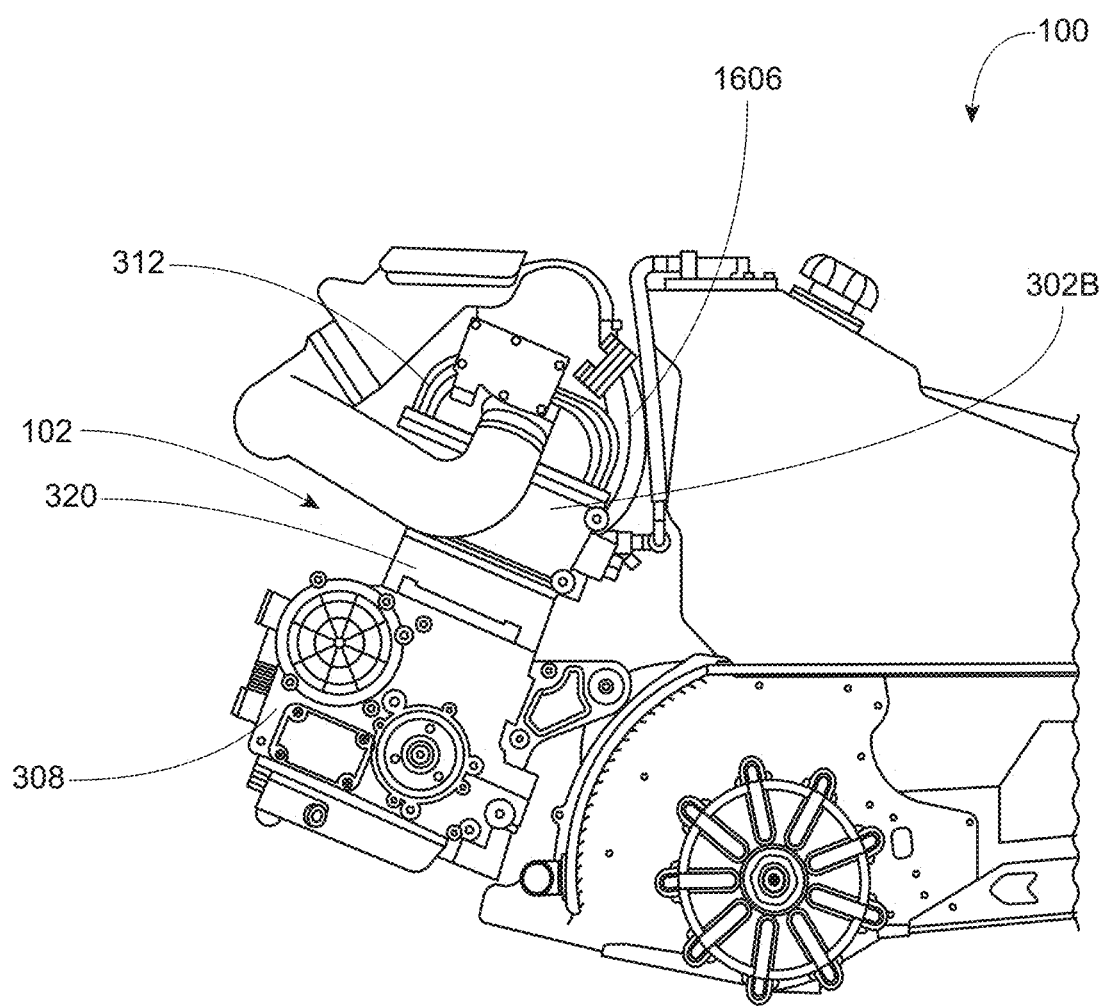

In some embodiments, the second cylinder head 302B comprises at least one rearward intake port 1606 through which air and fuel mixture enters the engine 300 and at least one forward exhaust port 402 through which gases produced by combustion of the air and fuel mixture are expelled (seen e.g., in FIGS. 4 and 16A-B). The at least one forward exhaust port 402 may comprise a first forward exhaust port 402A and a second forward exhaust port 402B. The at least one rearward intake port 1606 may be positioned towards the second direction (S2) of the longitudinal axis (L1) of the vehicle 100. The at least one forward exhaust port 402 is configured to be positioned towards the first direction (F2) of the longitudinal axis (L1) of the vehicle 100 (seen e.g., in FIGS. 4A, 18A, 18B).

Figure 17:
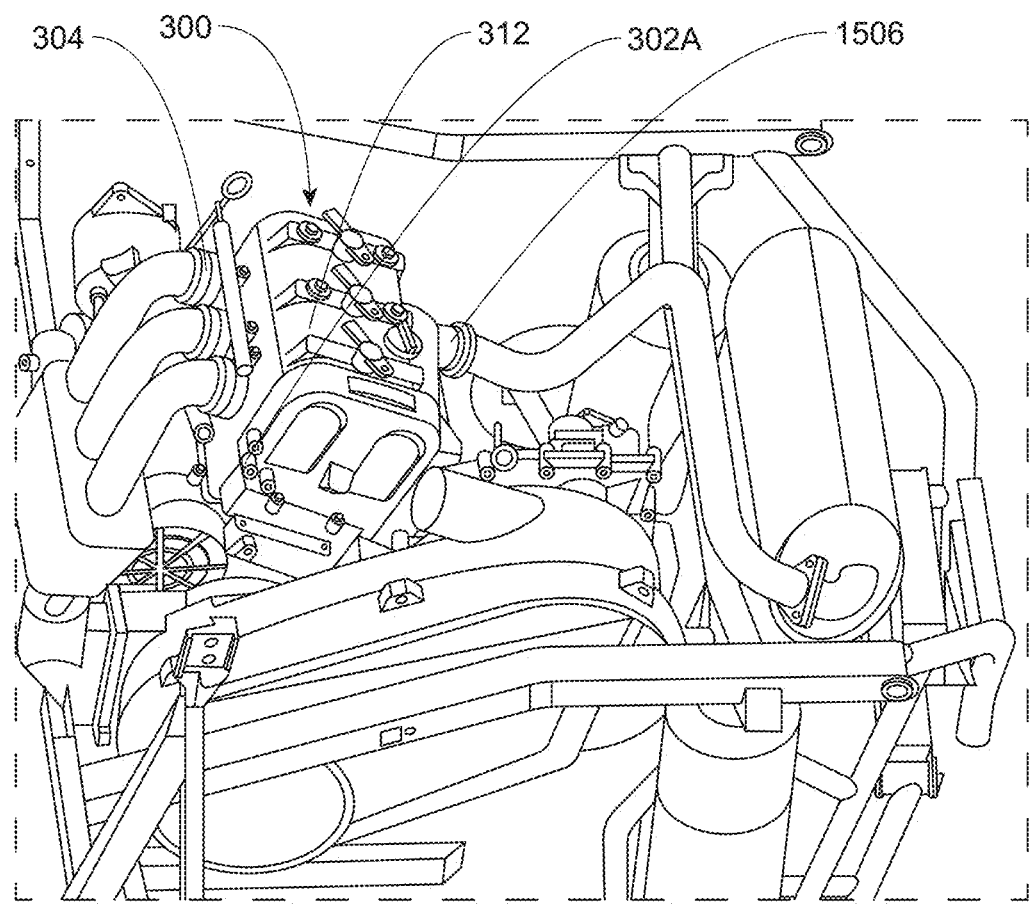
FIG. 17 illustrates an exemplary above view of an engine with forward intake ports, mounted in a rear portion of a vehicle in accordance with the present disclosure.

In some embodiments, the first cylinder head 302A with the at least one forward intake port 304 may be used in a side-by-side vehicle (seen e.g., in FIG. 17). In some embodiments, the second cylinder head 302B with the at least one forward exhaust port 402 may be used in a snowmobile. The interchangeability of the cylinder heads may facilitate use of one or more common engine components, such as an engine block, crankcase, etc. of the snowmobile in the side-by-side vehicle merely by changing a cylinder head and without changing other components. Hence, the reusability of the engine can be increased (i.e., increased parts commonality).

Figure 6:
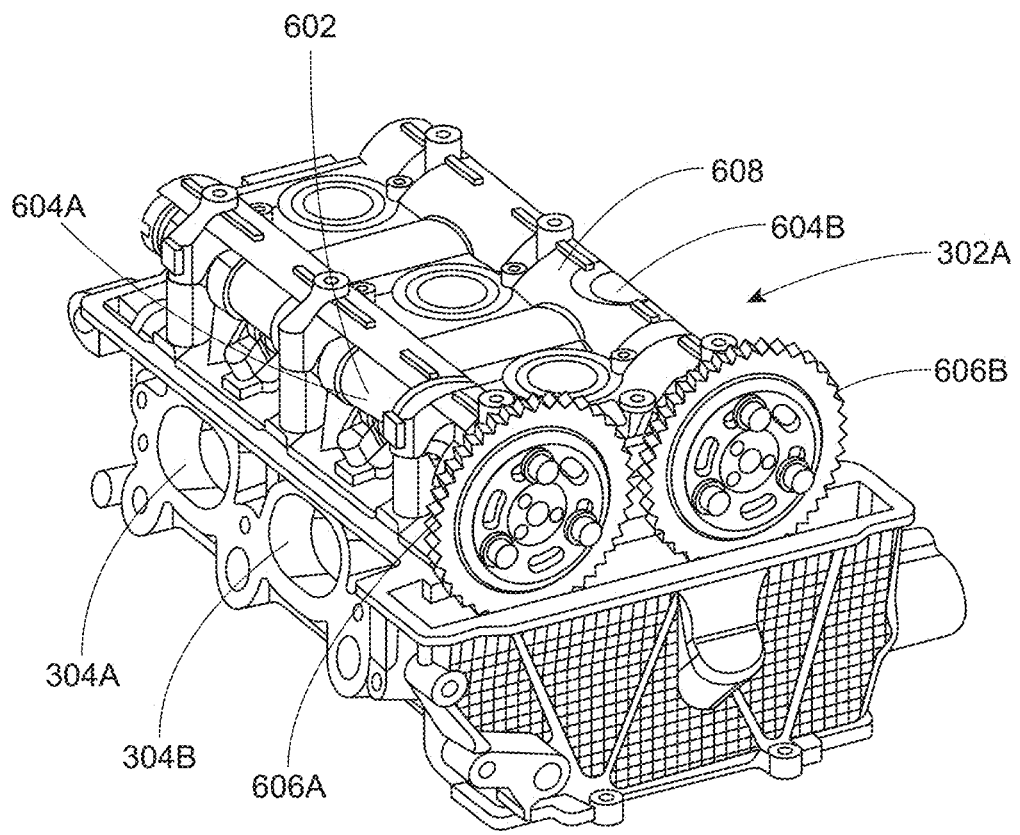
FIG. 6 illustrates an exemplary isometric view of a first cylinder head having camshafts and forward intake ports in accordance with the present disclosure.
Figure 7:
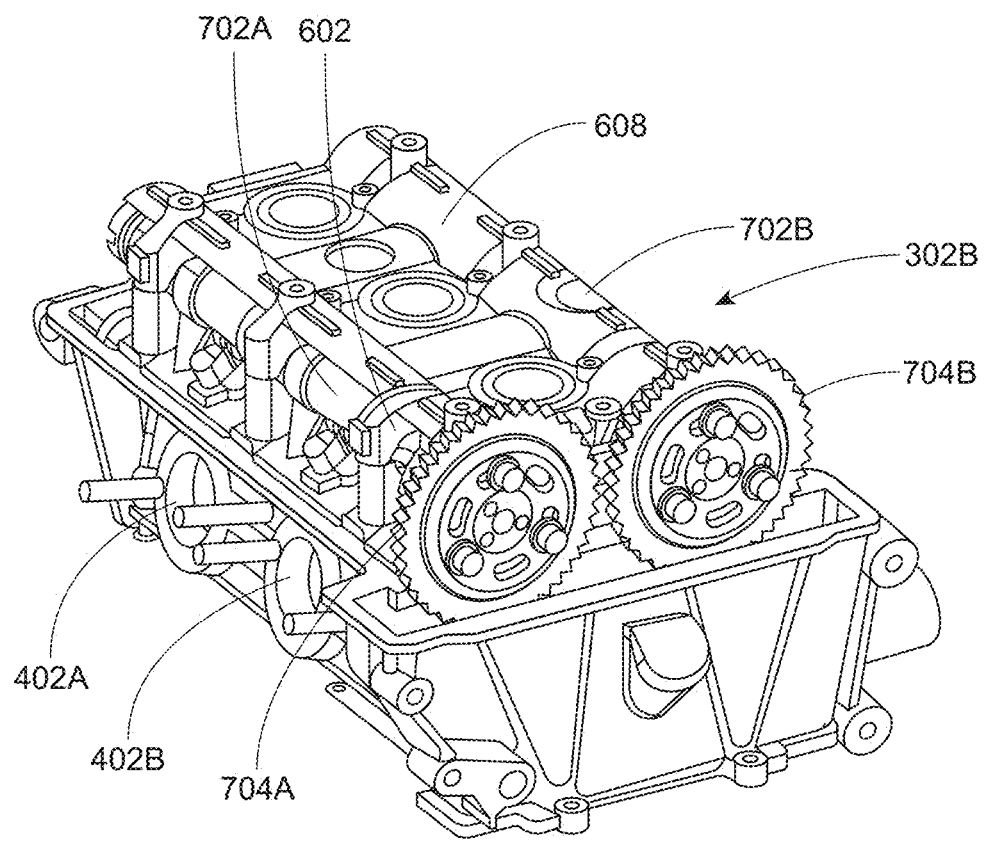
FIG. 7 illustrates an exemplary isometric view of a second cylinder head having camshafts and forward exhaust ports in accordance with the present disclosure.

The first cylinder head 302A and the second cylinder head 302B may be configured to receive at least one camshaft 602 therewithin (seen e.g., in FIGS. 6 and 7). The at least one camshaft in the first cylinder head may be received at a first location and in the second cylinder head at a second location. Due to the structure of the cylinder heads, the first location of the at least one camshaft in the first cylinder head 302A is same as the second location of the at least one camshaft in the second cylinder head 302B.

As discussed above, an engine may be configured with one of at least two differing cylinder heads, a first head with a combustion air intake on a first side and an exhaust exit on a second side and a second head with an exhaust exit on a first side and a combustion air intake on a second side. These various embodiments are preferably with the camshaft locations (e.g., four-stroke engine) arranged in the same places relative to the engine block, cam chain, etc. Thus, in some embodiments, the first cylinder head 302A comprises a first intake camshaft 604A and a first exhaust camshaft 604B therewithin (seen e.g., in FIG. 6). The first intake camshaft 604A and the first exhaust camshaft 604B may be rotatably mounted in the first cylinder head 302A.

Similarly, the second cylinder head 302B may comprise a second exhaust camshaft 702A, and a second intake camshaft 702B therewithin (seen e.g., in FIG. 7). The second exhaust camshaft 702A, and the second intake camshaft 702B may be rotatably mounted in the second cylinder head 302B. It is to be noted that locations of the first intake and exhaust camshafts 604A, 604B, respectively, of the first cylinder head 302A are positioned in the same locations of the second exhaust and intake camshafts, 702A, 702B, respectively, of the second cylinder head 302B. Thus, while in one cylinder head the intake camshaft 604A is on the left side (FIG. 8), in the other cylinder head (FIG. 9), the exhaust camshaft 702A is in that location since the exhaust outlets are on that side. For instance, a first intake camshaft location 802 is the same as a second exhaust camshaft location 902, and a first exhaust camshaft location 804 is in the same location as a second intake camshaft location 904 (seen e.g., in FIGS. 8 and 9).

It is to be noted that the first intake camshaft location 802 and the second exhaust camshaft location 902 refer to a physical location on which the first intake camshaft 604A and the second exhaust camshaft 702A, respectively, are placed or located. Accordingly, a design, an orientation, and a spacing of the first intake camshaft location 802 and the second exhaust camshaft location 902 with respect to the other engine components are same. Similarly, the first exhaust camshaft location 804 and the second intake camshaft location 904 refer to a physical location on which the first exhaust camshaft 604B and the second exhaust camshaft 702B, respectively, are placed or located.

Figure 8:
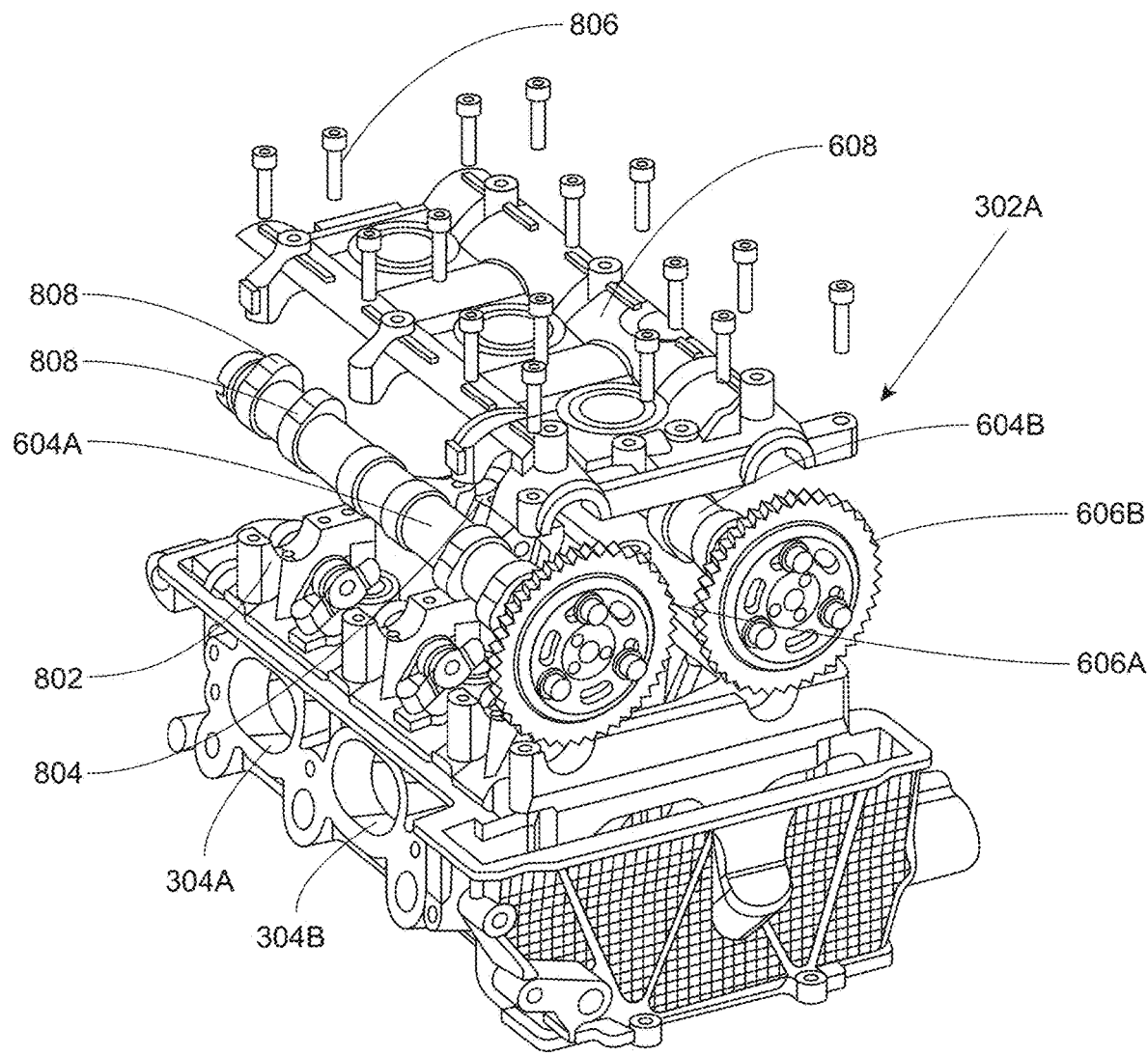
FIG. 8 illustrates an exemplary exploded view of a first cylinder head with forward intake ports in accordance with the present disclosure.
Figure 9:
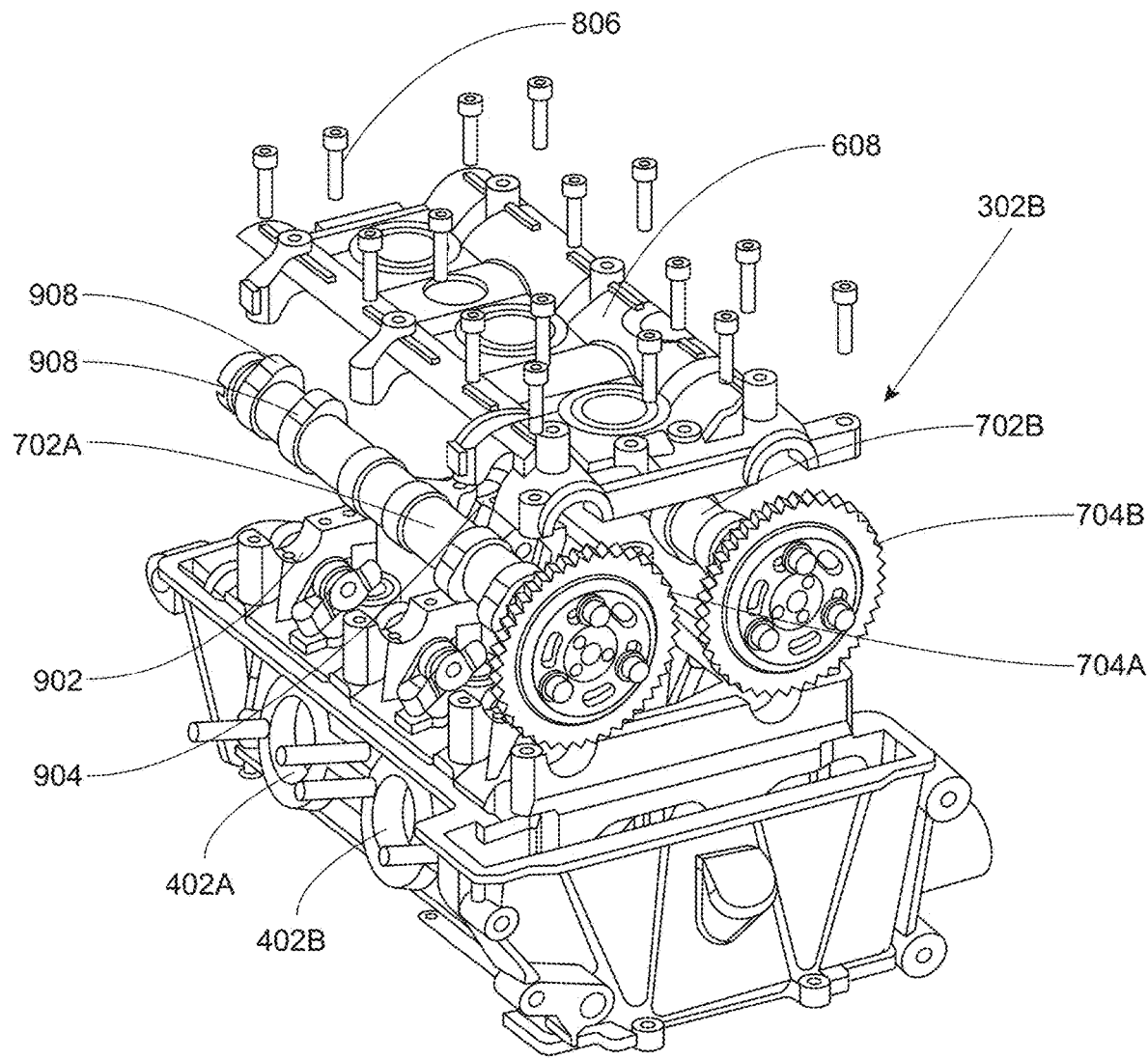
FIG. 9 illustrates an exemplary exploded view of a second cylinder head with forward exhaust ports in accordance with the present disclosure.

In some embodiments, the first intake camshaft 604A comprises a plurality of first intake cams 808 and the first exhaust camshaft 604B comprises a plurality of first exhaust cams (seen e.g., in FIG. 8). Similarly, the second exhaust camshaft 702A comprises a plurality of second exhaust cams 908 and the second intake camshaft 702B comprises a plurality of second intake cams (seen e.g., in FIG. 9). The first intake camshaft 604A and the first exhaust camshaft 604B are driven by a first intake sprocket 606A and a first exhaust sprocket 606B, respectively, that are attached to a first end of the first intake camshaft 604A and the first exhaust camshaft 604B (seen e.g., in FIG. 6). The second exhaust camshaft 702A and the second intake camshaft 702B are driven by a second intake sprocket 704B and a second exhaust sprocket 704A, respectively, that are attached to a first end of the second exhaust camshaft 702A and the second intake camshaft 702B (seen e.g., in FIG. 7). In some embodiments, the engine 300 comprises a camshaft housing 608 that is configured to cover or house the at least one camshaft 602 using fasteners 806 (seen e.g., in FIGS. 8 and 9). The same camshaft cover or housing may be used for both configurations of camshafts since the locations are common.

The cylinder head 302 comprises a valve assembly comprising at least one intake valve, at least one exhaust valve, and other components. The first cylinder head 302A comprises a plurality of first intake valves 1502A, and a plurality of first exhaust valves 1502B (seen e.g., in FIG. 15). The second cylinder head 302B comprises a plurality of second intake valves 1602B, and a plurality of second exhaust valves 1602A (seen e.g., in FIGS. 16A-B). The at least one camshaft 602 is configured to control opening and closing of the at least one intake valve and the at least one exhaust valve. Cams of the at least one camshaft 602 are actuated by the rotation of the camshaft 602, which in turn enables opening and closing of the at least one intake valve and the at least one exhaust valve. The plurality of first intake valves 1502A are actuated by the first intake camshaft 604A via the plurality of first intake cams 808 and the plurality of first exhaust valves 1502B are actuated by the first exhaust camshaft 604B via the plurality of first exhaust cams. The plurality of second intake valves 1602B are actuated by the second intake camshaft 702B via the plurality of second intake cams and a plurality of second exhaust valves 1602A are actuated by the second exhaust camshaft 702A via the plurality of second exhaust cams 908.

Figure 10:
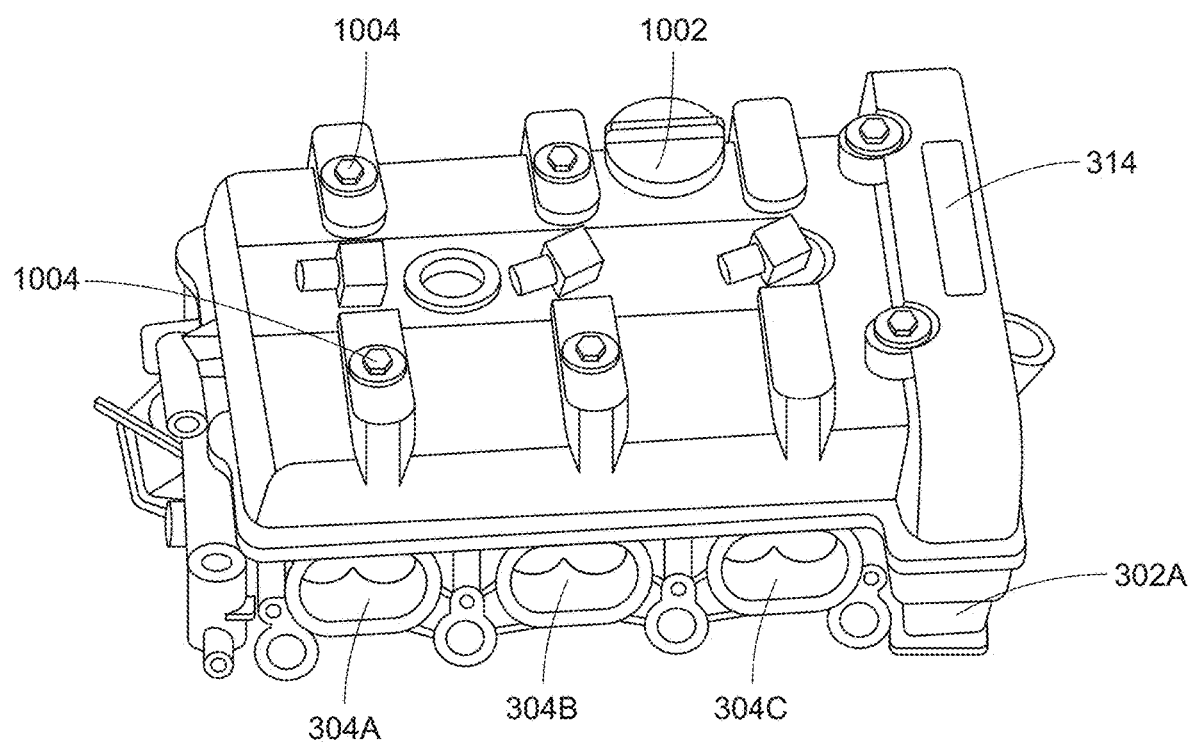
FIG. 10 illustrates an exemplary top isometric view of a valve cover attached over a cylinder head in accordance with the present disclosure.
Figure 11:
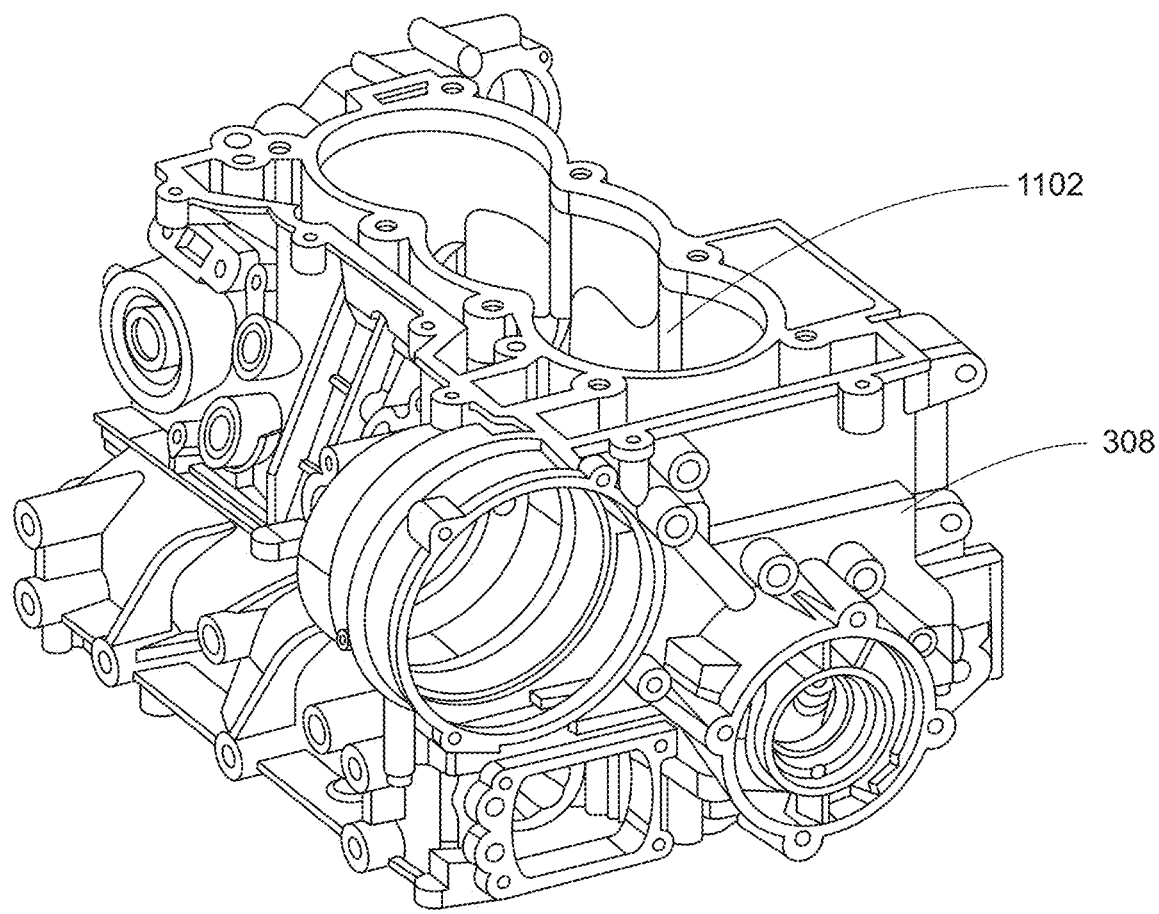
FIG. 11 illustrates an exemplary view of a crankcase in accordance with the present disclosure.

In some embodiments, the valve cover 312 is configured to be mounted on a top of the cylinder head 302 for housing the valve assembly (seen e.g., in FIGS. 3, 4, and 10). The valve cover 312 is configured to cover the top of each of the first cylinder head 302A and the second cylinder head 302B. It is to be noted that the valve cover 312 is same for the first cylinder head 302A and the second cylinder head 302B. The valve cover 312 is configured to be attached to the top of each of the first cylinder head 302A and the second cylinder head 302B using fasteners 1004 (seen e.g., in FIG. 10). The valve cover 312 may comprise an oil filler cap 1002 to seal an oil fill opening (seen e.g., in FIG. 10).

In some embodiments, the crankcase 308 is configured to house the crankshaft 310 for enabling rotation of the at least one camshaft 602 (seen e.g., in FIGS. 3-4). The engine 300 further comprises a timing chain 1704 or a timing belt or a driving mechanism that is positioned at a first side (F3) of a central axis (C1) of the vehicle 100 extending in the longitudinal direction (L1) (seen e.g., in FIG. 14A). In other words, the timing chain 1704 is positioned at a left side when seen from rear of the vehicle 100. The first side (F3) may correspond to the left side of the vehicle 100. The timing chain 1704 is configured to connect a first end of the at least one camshaft 602 and a first end of the crankshaft 310 to synchronize a rotation of the crankshaft 310 and the at least one camshaft 602 for opening and closing of the at least one intake valve and the at least one exhaust valve. The at least one camshaft 602 is driven by the crankshaft 310 through the timing chain 1704 by driving intake and exhaust sprockets. In some embodiments, the first end of the first intake camshaft 604A and the first end of the first exhaust camshaft 604B are connected to the first first end of the crankshaft 310 via the timing chain 1704 (seen e.g., in FIG. 14A). The first intake camshaft 604A and the first exhaust camshaft 604B are driven by the crankshaft 310 through the timing chain 1704 by driving the first intake sprocket 606A and the first exhaust sprocket 606B. In some embodiments, the first end of the second intake camshaft 702B and the first end of the second exhaust camshaft 702A are connected to the first end of the crankshaft 310 via the timing chain 1704. The second exhaust camshaft 702A and the second intake camshaft 702B are driven by the crankshaft 310 through the timing chain 1704 by driving the second exhaust sprocket 704A and the second intake sprocket 704B. In an illustrative example, the timing chain 1704 is same for the engine 300 having any one of the first cylinder head 302A and the second cylinder head 302B.

Figure 14A:
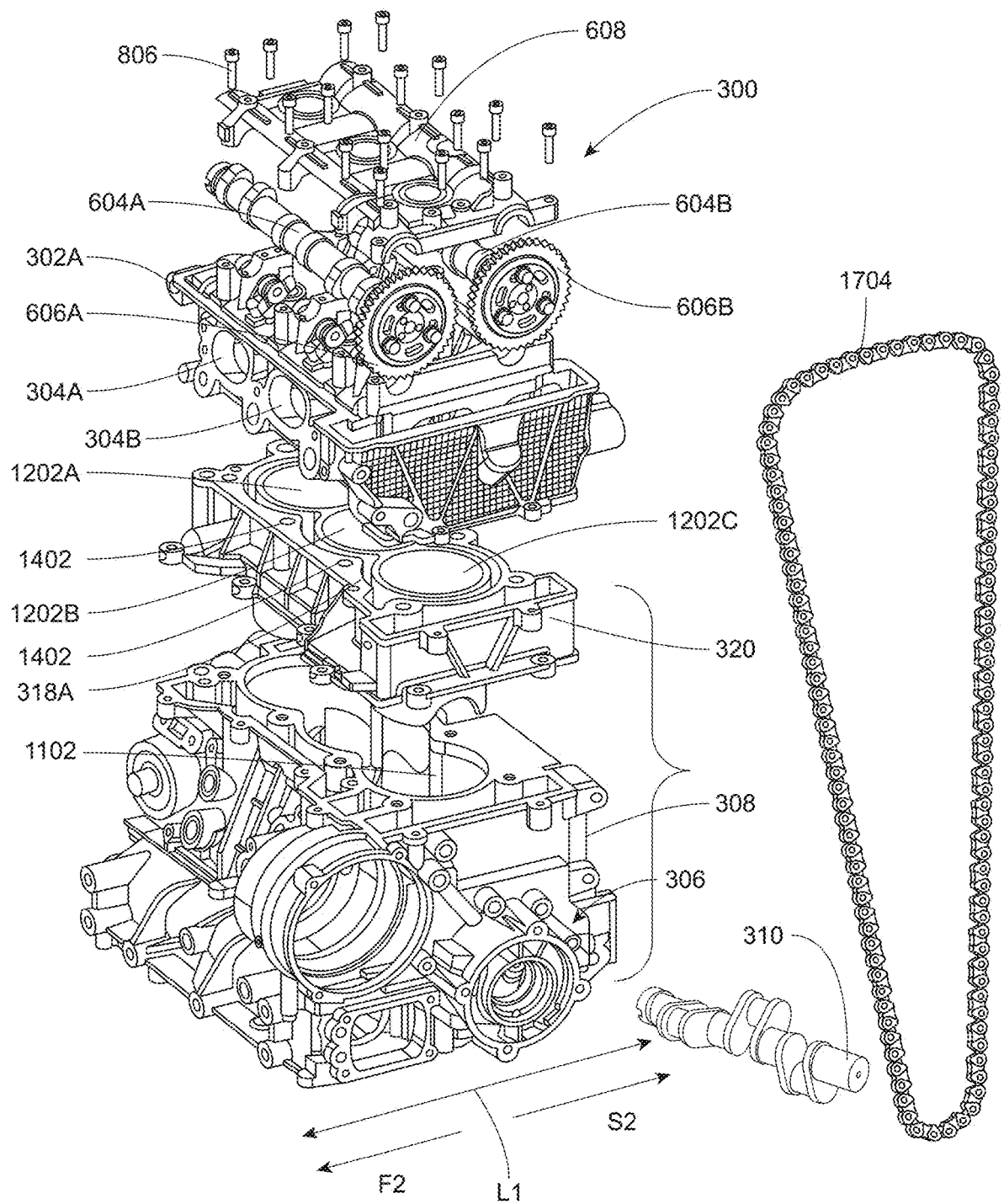
FIG. 14A illustrates an exemplary exploded view of an engine with forward intake ports in accordance with the present disclosure.
Figure 14B:
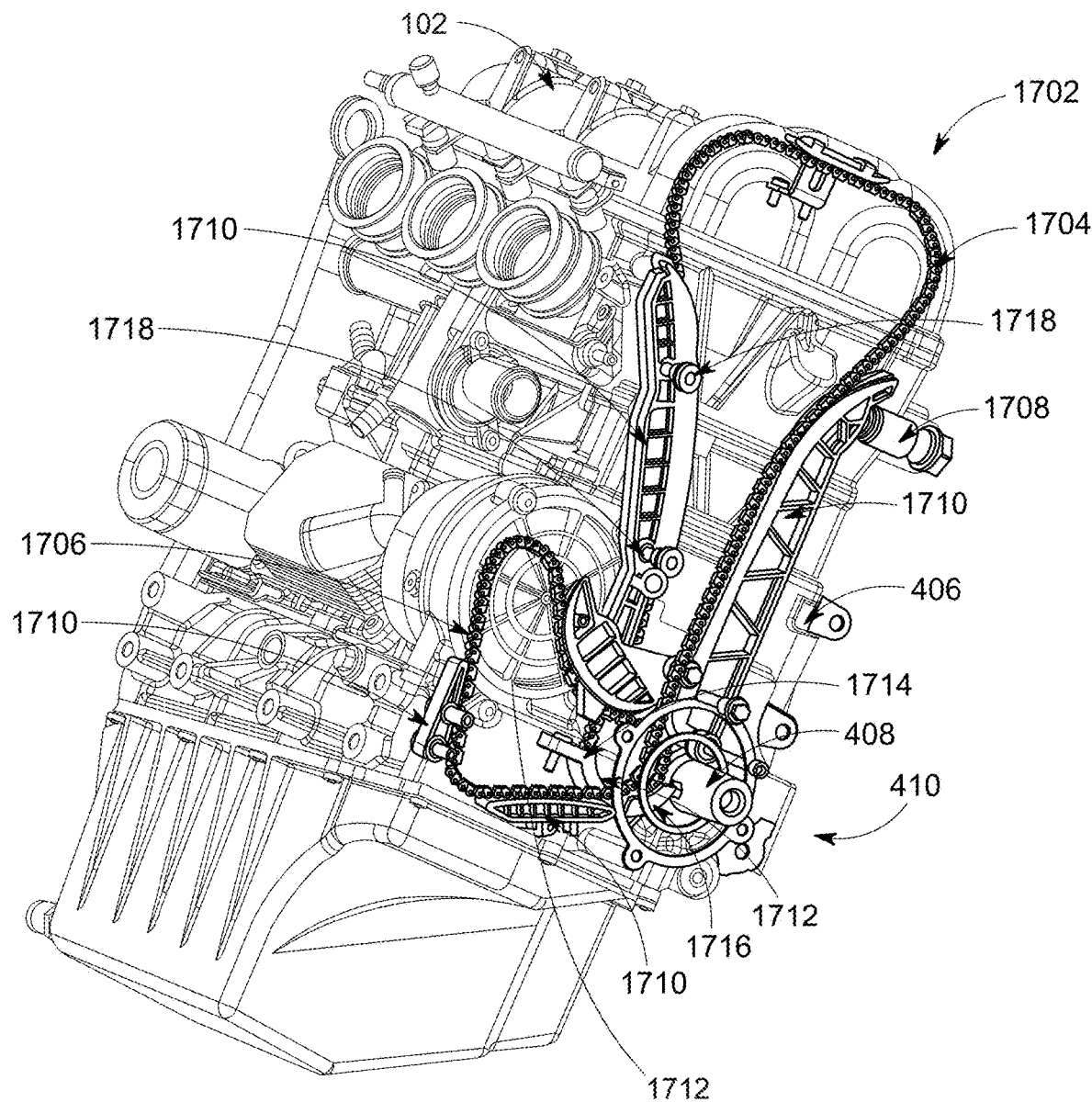
FIGS. 14B-14D illustrate the timing chain and guides of the engine.
Figure 14C:
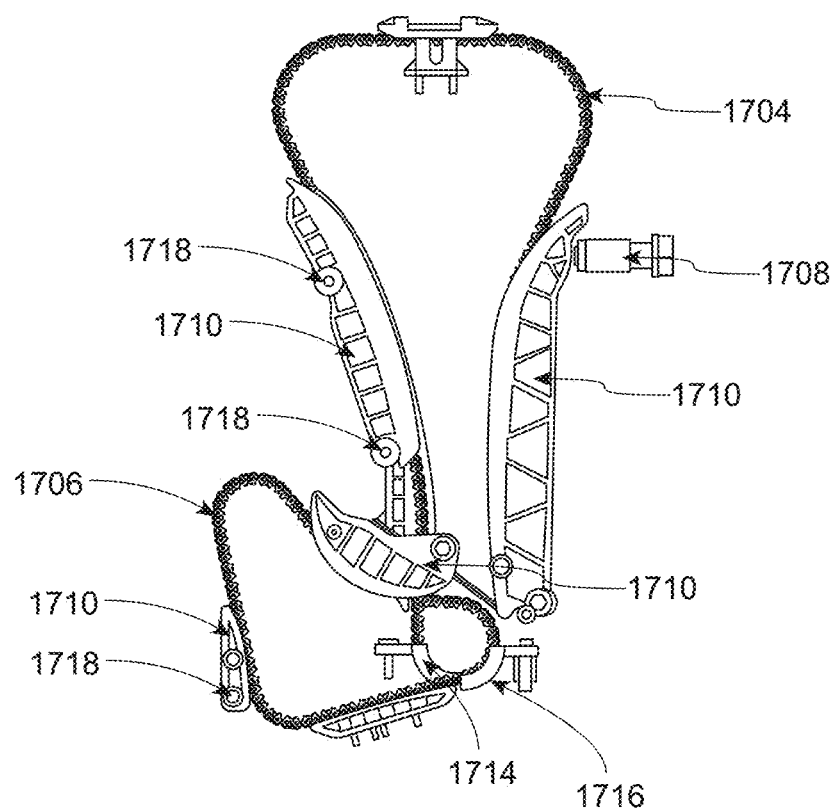
Figure 14D:
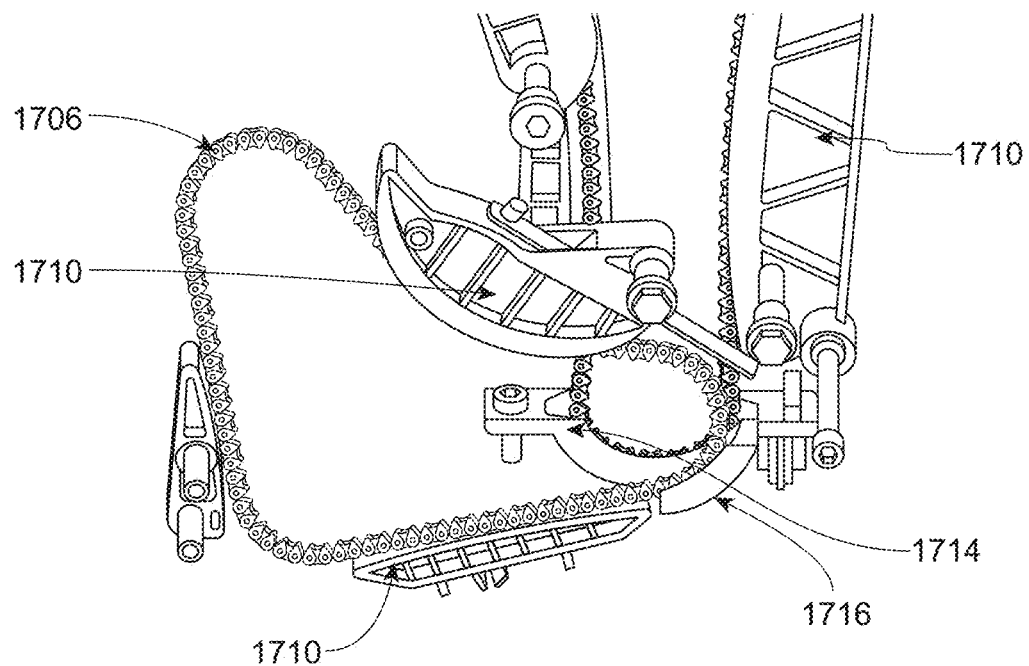

FIGS. 14B, 14C, and 14D further illustrate the PTO side 410 of the engine 102. The engine 102 may include a plurality of drive chains for providing rotational movement to different components attached thereto. The engine 102 assembly includes a drive chain assembly 1702. The drive chain assembly 1702 includes a timing chain 1704 configured to couple the crankshaft 408 (similar or the same as crankshaft 310) with at least one camshaft 604A, 604B (seen e.g., in FIG. 14A). The drive chain assembly 1702 may further include an auxiliary drive chain 1706 configured for operating an oil pump 2018 and/or a coolant pump 2012. Each of the timing chain 1704 and the auxiliary drive chain 1706 is configured to be a silent chain (also sometimes known as an inverted tooth chain).

It is to be noted that the silent chains use specific sprockets having teeth for engaging therewith. Such silent chains may be the type with inverted teeth engaging the gear teeth, one of such offered by Morse chains. The silent chains engage with the teeth with little impact or sliding. Such engagement results in reduced noise, vibration, and harshness (NVH) of the vehicle 100. This ensures smoother operation of the engine 102 having such silent chains.

The drive chain assembly 1702 may be configured to be operated using the crankshaft 408 of the engine 102. Accordingly, the crankshaft 408 is configured to operate each of the timing chain 1704 and the auxiliary drive chain 1706. Both the timing chain 1704 and the auxiliary drive chain 1706 are attached at the same side of the engine 302, that is at the PTO side 410 (seen e.g., in FIG. 14B). The timing chain 1704 is located inboard of the auxiliary drive chain 1706 from the first end of the crankshaft 408. The first end of the crankshaft 408 corresponds to the first side (F2) or the PTO side 410 of the crankshaft 408.

The drive chain assembly 1702 may further include a plurality of chain guides 1710 attached to the crankcase 406 (seen e.g., in FIG. 17). The plurality of chain guides 1710 are configured to guide and tension the timing chain 1704 as well as the auxiliary drive chain 1706 in their intended movement. The plurality of chain guides 1710 are attached to the crankcase 406 at the first side (F2), i.e., the PTO side 410 of engine 102 or the crankshaft 408. The plurality of chain guides 1710 may be attached to the crankcase 406 using a plurality of fasteners 1718. The plurality of chain guides 1710 may be made of nylon material. The drive chain assembly 1702 further comprises a chain tensioner 1708 for adjusting tension of the timing chain 1704 between the crankshaft 408 and the at least one camshaft 2002 (seen e.g., in FIG. 14B). The chain tensioner 1708 may be a hydraulic tensioner. In an embodiment, a tension of the timing chain 1704 is kept such that a minor movement of the timing chain 1704, while the engine 102 or the vehicle 100 is in operation, is allowed.

The chain tensioner 1708 may be attached to a side of the crankcase 406 that is adjacent to the PTO side 410. The drive chain assembly 1702, chain guides 1710, and chain tensioner 1708 may all remain in the same position with either engine, one with a forward-facing intake or a forward-facing exhaust. This arrangement is due to the same positional placement of the cam shafts 604A and 604B on both engine arrangements. Thus, the common engine parts may be used for both to reduce part count and commonality between engines.

The drive chain assembly 1702 may further comprise a lower support 1712 (seen e.g., in FIGS. 17-19). The lower support 1712 is configured to be placed at a lower side of the crankcase 406 towards the ground and below the crankshaft 408. The lower support 1712 is configured to receive the timing chain 1704 and the auxiliary drive chain 1706 therewithin. For the same, the lower support 1712 includes a first guide portion 1714 for receiving the timing chain 1704 and a second guide portion 1716 for receiving the auxiliary drive chain 1706. The lower support 1712 is preferably a single piece but may alternatively be separate pieces for the first guide portion 1714 and the second guide portion 1716. The lower support 1712 is mainly configured to provide support to the timing chain 1704 and the auxiliary drive chain 1706. Moreover, the lower support 1712 may be configured to receive and contain lubricant in the first guide portion 1714 and the second guide portion 1716. The contained lubricant may provide lubrication to a portion of each of the timing chain 1704 and the auxiliary drive chain 1706 that passes through the first guide portion 1714 and the second guide portion 1716, respectively.

These lower supports are likewise common to both engines, the forward-facing intake and the forward-facing exhaust engines.

The cylinder head 302 further comprises at least one spark plug receiver. The spark plug receiver may be positioned at a spark plug angle with respect to the longitudinal axis (L1) of the vehicle 100. Accordingly, the first cylinder head 302A comprises at least one first spark plug receiver 1504 that is positioned at a first spark plug angle (a1) with respect to the longitudinal axis (L1) of the vehicle 100 (seen e.g., in FIG. 15), and the second cylinder head 302B comprises at least one second spark plug receiver 1604 that is positioned at a second spark plug angle (2) with respect to the longitudinal axis (L1) of the vehicle 100 (seen e.g., in FIGS. 16A-B). In some embodiments, the first spark plug angle (a1) and the second spark plug angle (a2) may be same. In other embodiments, the first spark plug angle (a1) and the second spark plug angle (a2) may be different, for instance, by at least one degree. The first spark plug angle and the second spark plug angle may be selected based on a location of intake and exhaust ports of the engine. For instance, the first spark plug angle of the first cylinder head 302A with the forward intake port 304 and the rearward exhaust port 1506 may be more, at least by one degree.

Figure 12:
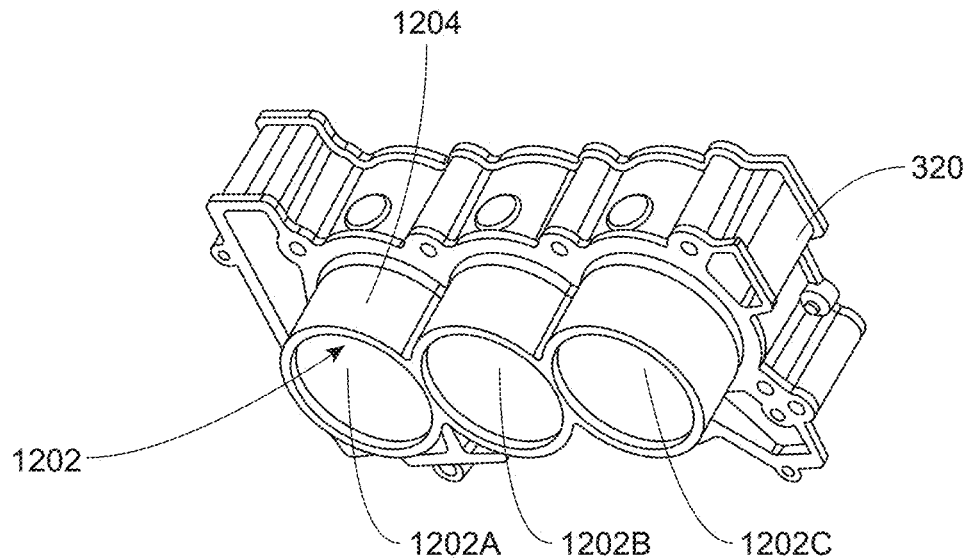
FIGS. 12-13 illustrate exemplary underside view and above view, respectively, of a cylinder block in accordance with the present disclosure.
Figure 13:
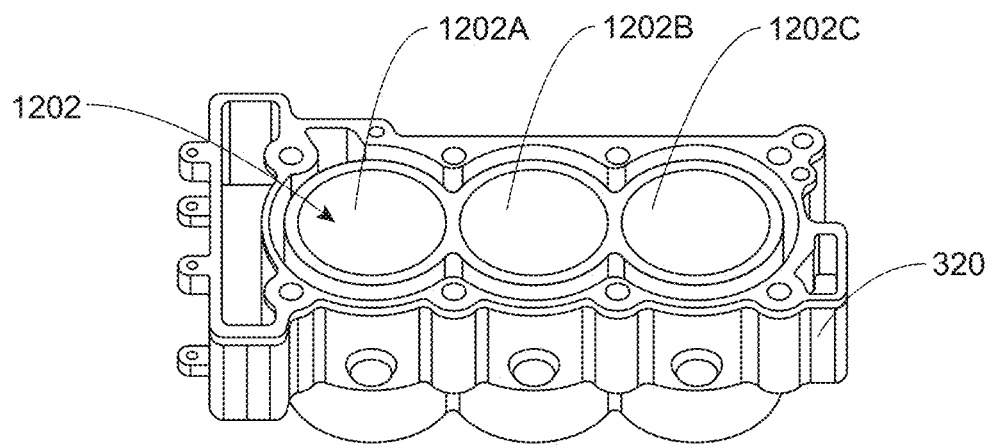

The present disclosure further sets forth an engine assembly 102 that is configured to have a cylinder block 320 selected from a plurality of cylinder blocks (seen e.g., in FIGS. 12-13). The cylinder block 320 may be configured to be removably attached on a top surface of the crankcase 308 using at least one third fastener (seen e.g., in FIG. 14). While attaching the cylinder block 320, at least a portion of the cylinder block 320 may be configured to be received in an opening 1102 of the crankcase 308. The cylinder block 320 may be selected from any one of a first cylinder block and a second cylinder block. In an embodiment, different cylinder blocks represent a difference in material from which the cylinders are made. In an exemplary embodiment, the first cylinder block may be made of cast iron. The cast iron cylinder blocks may be used in applications where the power requirement is relatively lower compared to a high-performance engine, for example. For instance, the cylinder blocks made of cast iron may be used in engines requiring a power less than 100 horsepower (hp). The cast iron cylinder blocks may be formed using gravity sand casting, then machining portions of the cylinder block from the gravity sand casting to a specific shape and dimensions, thereafter honing the cylinders for final surface finishing. The use of cast iron cylinder blocks may facilitate in a reduction or damping NVH (Noise, Vibration, and Harshness) because of a heavier weight and other characteristics of the cast iron, which results in improving the life of the engine 300. In an embodiment, a cast iron cylinder block may weigh around 9.1 kilograms (kg). Further, the use of the cast iron cylinder block increases durability of the engine 300. The cast iron cylinder block may be used in a utility side-by-side off-road vehicle.

The second cylinder block may be made of aluminum. Aluminum cylinder blocks may be used in vehicles having high performance power requirements. For instance, the cylinder blocks made of aluminum may be used in engines requiring a power greater than 100 hp, low friction, and high thermal conductivity. In an embodiment, the aluminum cylinder block may weigh around 3.4 kg. The aluminum cylinder block may be formed using a high pressure die casting, machining a cylinder block mold from the high pressure die casting to a specific shape and dimensions, coating the cylinder block, thereafter, honing the cylinder block to perform surface finishing. The aluminum cylinder block may be used in off-road vehicles where lower weight and higher performance is required. In some embodiments, cylinder blocks made from aluminum may be constructed with thicker walls than those made with iron since iron is typically stronger than aluminum.

It is to be noted that the crankcase 308 may be the same for the engine 300 having any one of the first cylinder block and the second cylinder block. In other words, the crankcase may be common when used with any of the first and the second cylinder blocks, thereby providing flexibility in the same engine to use different cylinder blocks made of different materials based on an application (e.g., power requirement) and/or a type or a model of the vehicle.

In some embodiments, the cylinder block 320 comprises a plurality of cylinders 1202A, 1202B, 1202C defined by a cylinder outer wall 1204. Each of the plurality of the cylinders 1202A, 1202B, 1202C are formed adjacent to each other. In the plurality of the cylinders 1202A, 1202B, 1202C, combustion of the air and fuel mixture is performed, and power is generated to move the vehicle 100 via the crankshaft 310 (seen e.g., in FIGS. 12, 13). Each of the plurality of the cylinders 1202A, 1202B, 1202C comprises a piston 1508 being axially reciprocable and connected to the crankshaft 310 via a connecting rod 1510 and a piston ring to form a seal between a respective piston and a respective cylinder inner wall (seen e.g., in FIGS. 15-16B). In some embodiments, the first cylinder block comprises a plurality of first cylinders defined by a first cylinder outer wall, each of the plurality of the first cylinders are formed adjacent to each other. The plurality of first cylinders comprises a plurality of first pistons being axially reciprocable and a plurality of first piston rings configured to form a seal between a respective first piston and a respective first cylinder inner wall. The plurality of first pistons may be connected to the crankshaft 310 via a corresponding first connecting rod.

The second cylinder block comprises a plurality of second cylinders defined by a second cylinder outer wall, each of the plurality of the second cylinders are formed adjacent to each other. The plurality of second cylinders comprises a plurality of second pistons being axially reciprocable and a plurality of second piston rings that form a seal between a respective second piston and a respective second cylinder inner wall. The plurality of second pistons may be connected to the crankshaft 310 via a corresponding second connecting rod.

In use of both the first and the second cylinder blocks, the crankshaft 310 is configured to convert force generated by the combustion in the engine 300 into a rotary motion. Linear upwards and downwards motion of each of the plurality of the first and the second pistons is converted into a torque by the corresponding first and second connecting rods and thereafter transmitted to wheels or track of the vehicle 100.

Each of the plurality of the first cylinders comprises a first cylinder inner wall having a first coating. A non-limiting example of the first coating is enamel coating. In other words, in the cylinder block made of the cast iron, the first coating of enamel may be used. In some embodiments, each of the plurality of the second cylinders may comprise a second cylinder inner wall having a second coating that may be different than the first. In other words, the cylinder block made of aluminum may have a second coating the inner wall of the cylinders. A non-limiting example of the second coating may be Nickel-Carbide-Silicon coating. It is to be noted that the first coating and second coating may be selected based on the application such as longer wear or wear resistance, corrosion resistance, thermal stability, friction, and tighter tolerances. Optionally/additionally, the cylinder block 320 may comprise at least one cylinder sleeve or at least one cylinder liner located inside a corresponding cylinder for providing sealing between an inner wall of the corresponding cylinder and a corresponding piston. For instance, the first cylinder block (made of cast iron) may not require a sleeve between the inner wall of the cylinders and the plurality of first pistons, and the second cylinder block (made of aluminum) may comprise a first cylinder sleeve located between the inner wall of a corresponding second cylinder and the corresponding piston of the plurality of second pistons.

In some embodiments, the cylinder block 320 may comprise a cooling jacket surrounding an outer wall of the cylinder block. Accordingly, the first cylinder block may comprise a first cooling jacket surrounding an outer wall of the plurality of the first cylinders, and the second cylinder block may comprise a second cooling jacket surrounding an outer wall of the plurality of the second cylinders. A coolant used in the cooling jacket may be a mixture of ethylene glycol and water.

In some embodiments, the engine 300 comprises an oil filter 316 that is positioned at a bottom corner of the engine 300, on second sides (S3) of the central axis (C1) of the vehicle 100. In other words, the second side may correspond to the right side when seen from the rear of the vehicle 100. The engine 300 may comprise an oil pan 314 which is attached to a bottom of the engine 300. The oil pan 314 may comprise oil which is pumped throughout the engine 300 to lubricate, clean and cool moving parts.

It is to be noted that the first cylinder block may be configured to receive any of the first cylinder head 302A and the second cylinder head 302B. Similarly, the second cylinder block may be configured to receive any of the first cylinder head 302A and the second cylinder head 302B. A mounting interface and a mounting location in the first cylinder block and the second cylinder block are same.

The present disclosure further sets forth a method of installing the engine assembly 102 in the vehicle 100. The method includes installing the cylinder block 320 that is selected from a first cylinder block and a second cylinder block, installing the cylinder head 302 from a plurality of cylinder heads to the cylinder block 320 via cylinder head mounting interface, and installing at least one camshaft 602 in the cylinder head 302.

The fasteners used throughout the present disclosure may be nut and bolt fasteners used in automobile industry. In some embodiments, the bolt in such fasteners may have a hex-head, followed by a hex-headed cap screw and a stud.

It is to be noted that different values and parameters mentioned in the description are exemplary in nature and are not intended to bound the specification in any manner.

Finally, while the present invention has been described above with reference to various exemplary embodiments, many changes, combinations, and modifications may be made to the exemplary embodiments without departing from the scope of the present invention. For example, the various components may be implemented in alternative ways. These alternatives can be suitably selected depending upon the particular application or in consideration of any number of factors associated with the operation of the device. In addition, the techniques described herein may be extended or modified for use with other types of devices. These and other changes or modifications are intended to be included within the scope of the present invention.

What is claimed is:

1. An engine assembly for a vehicle, the engine assembly having a first side and a second side, the engine assembly comprising:
    a cylinder block, and
    a modular cylinder head mounted to a cylinder head mounting interface of the cylinder block, the modular cylinder head configured to be selectively embodied one or the other of a first configuration and a second configuration such that:
        in the first configuration, the modular cylinder head is a first cylinder head with a first construction, the first cylinder head including at least one first intake camshaft and at least one first exhaust camshaft in a double overhead camshaft arrangement, wherein the intake is on a first side of the engine; and
        in the second configuration, the modular cylinder head is a second cylinder head with a second construction that is different from the first construction, the second cylinder head including at least one second intake camshaft and at least one second exhaust camshaft in a double overhead camshaft arrangement, wherein the intake is on a second side of the engine; and wherein a location of the at least one first intake camshaft relative to the cylinder block in the first configuration is identical to a location of the at least one second exhaust camshaft relative to the cylinder block in the second configuration.

2. The engine assembly according to claim 1, wherein in the first configuration, the first cylinder head further includes at least one forward intake port that faces a front side of the vehicle, and at least one rearward exhaust port that faces a rear side of the vehicle, and wherein in the second configuration, the second cylinder head further includes at least one rearward intake port that faces the rear side of the vehicle, and at least one forward exhaust port that faces the front side of the vehicle.

3. The engine assembly according to claim 1, wherein the modular cylinder head includes a forward camshaft mounting position and a rearward camshaft mounting position, wherein the at least one first camshaft includes the first intake camshaft arranged in the forward camshaft mounting position, and the first exhaust camshaft arranged in the rearward camshaft mounting position, and wherein the at least one second camshaft includes the second intake camshaft arranged in the rearward camshaft mounting position, and the second exhaust camshaft arranged in the forward camshaft mounting position.

4. The engine assembly of claim 3, further comprising:
a crankshaft; and
a cam chain and chain guides,
wherein a location of the cam chain and chain guides relative to the crankshaft and the at least one first intake camshaft in the first configuration is identical to a location of the cam chain and chain guides relative to the crankshaft and the at least one second exhaust camshaft in the second configuration.

5. The engine assembly according to claim 1, wherein in the first configuration, the first cylinder head is removably mounted to the cylinder head mounting interface of the cylinder block via at least one first fastener, wherein in the second configuration, the second cylinder head is removably mounted to the cylinder head mounting interface of the cylinder block via at least one second fastener, wherein the cylinder head mounting interface includes a mounting location configured to receive the at least one first fastener when in the first configuration, and to receive the at least one second fastener when in the second configuration, and wherein the cylinder block is removably secured to a crankcase.

6. The engine assembly according to claim 1, further comprising a valve cover configured to be mounted on a top of the modular cylinder head so as to house a valve assembly.

7. The engine assembly according to claim 1, further comprising:
a crankcase including a crankshaft; and
a timing chain configured to connect a first end of the crankshaft to a first end of the at least one first intake camshaft when in the first configuration, and to connect the first end of the crankshaft to a first end of the at least one second exhaust camshaft when in the second configuration, so as to actuate at least one intake valve and at least one exhaust valve, wherein the cylinder block is configured to be attached to a top surface of the crankcase.

8. The engine assembly according to claim 1, wherein the cylinder block is a cast iron cylinder block or an aluminum cylinder block.

9. The engine assembly according to claim 1, wherein the first cylinder head further includes at least one first spark plug receiver positioned at a first spark plug angle with respect to a longitudinal axis of the vehicle, and wherein the second cylinder head further includes at least one second spark plug receiver positioned at a second spark plug angle different than the first spark plug angle with respect to the longitudinal axis of the vehicle.

10. An engine assembly for a vehicle, the engine assembly comprising:
a crankcase;
a modular cylinder block mounted to the crankcase, the modular cylinder block configured to be selectively embodied in a first cylinder block configuration and a second cylinder block configuration such that:
in the first cylinder block configuration, the modular cylinder block is a first cylinder block constructed of a first material, the first cylinder block including a plurality of first cylinders, and
in the second cylinder block configuration, the modular cylinder block is a second cylinder block constructed of a second material that is different from the first material, the second cylinder block including a plurality of second cylinders; and
a modular cylinder head mounted to a cylinder head mounting interface of the modular cylinder block, the modular cylinder head configured to be selectively embodied in one or the other a first cylinder head configuration and a second cylinder head configuration such that:
in the first cylinder head configuration, the modular cylinder head is a first cylinder head with a first construction, the first cylinder head including at least one first intake camshaft, and
in the second cylinder head configuration, the modular cylinder head is a second cylinder head with a second construction that is different from the first construction, the second cylinder head including at least one second exhaust camshaft,
wherein a location of the at least one first intake camshaft relative to the crankcase in the first cylinder head configuration is identical to a location of the at least one second exhaust camshaft relative to the crankcase in the second cylinder head configuration.

11. The engine assembly according to claim 10, wherein in the first cylinder head configuration, the first cylinder head further includes at least one forward intake port that faces a front side of the vehicle, and at least one rearward exhaust port that faces a rear side of the vehicle, and wherein in the second cylinder head configuration, the second cylinder head further includes at least one rearward intake port that faces the rear side of the vehicle, and at least one forward exhaust port that faces the front side of the vehicle.

12. The engine assembly according to claim 10, wherein the modular cylinder head includes a forward camshaft mounting position and a rearward camshaft mounting position, wherein the at least one first intake camshaft includes the first intake camshaft arranged in the forward camshaft mounting position, and a first exhaust camshaft arranged in the rearward camshaft mounting position, and wherein the at least one second camshaft includes a second intake camshaft arranged in the rearward camshaft mounting position, and a second exhaust camshaft arranged in the forward camshaft mounting position.

13. The engine assembly according to claim 10, wherein in the first cylinder head configuration, the first cylinder head is removably mounted to the cylinder head mounting interface of the modular cylinder block via at least one first fastener, and wherein in the second cylinder head configuration, the second cylinder head is removably mounted to the cylinder head mounting interface of the modular cylinder block via at least one second fastener, wherein the cylinder head mounting interface includes a mounting location configured to receive the at least one first fastener when in the first cylinder head configuration, and to receive the at least one second fastener when in the second cylinder head configuration.

14. The engine assembly according to claim 10, further comprising a valve cover configured to be mounted on top of the modular cylinder head so as to house a valve assembly.

15. The engine assembly according to claim 10, further comprising:

a crankshaft arranged in the crankcase; and a timing chain configured to connect a first end of the crankshaft to a first end of the at least one first camshaft when in the first cylinder head configuration, and to connect the first end of the crankshaft to a first end of the at least one second camshaft when in the second cylinder head configuration, so as to actuate at least one intake valve and at least one exhaust valve.

16. The engine assembly according to claim 10, wherein the first cylinder block is a cast iron cylinder block, and the second cylinder block is an aluminum cylinder block.

17. The engine assembly according to claim 16, wherein each of the first cylinders includes a first cylinder inner wall with a first coating, and each of the second cylinders includes a second cylinder inner wall with a second coating that is different from the first coating.

18. The engine assembly according to claim 10, wherein the first cylinders include first cylinder inner walls and the second cylinders include second cylinder inner walls and wherein the first cylinder block further includes:

a plurality of first pistons respectively received within the plurality of first cylinders so as to axially reciprocate, and a plurality of first cylinder sleeves respectively arranged in the plurality of first cylinders so as to form a seal between the first cylinder inner walls and the respective first piston of each of the first cylinders, and wherein the second cylinder block further includes:

a plurality of second pistons respectively received within the plurality of second cylinders so as to axially reciprocate, and a plurality of second cylinder sleeves respectively arranged in the plurality of second cylinders so as to form a seal between the second cylinder inner walls and the respective second piston of each of the second cylinders.

19. The engine assembly according to claim 10, wherein in the first cylinder head configuration, the first cylinder head further includes at least one first spark plug receiver positioned at a first spark plug angle with respect to a longitudinal axis of the vehicle, and wherein in the second cylinder head configuration, the second cylinder head further includes at least one second spark plug receiver positioned at a second spark plug angle different than the first spark plug angle with respect to the longitudinal axis of the vehicle.

20. The engine assembly according to claim 10, wherein the modular cylinder block is tilted rearwardly with respect to a longitudinal axis of the vehicle.

* * * * *